United States Patent
Hunkins et al.

(10) Patent No.: US 7,861,013 B2
(45) Date of Patent: Dec. 28, 2010

(54) DISPLAY SYSTEM WITH FRAME REUSE USING DIVIDED MULTI-CONNECTOR ELEMENT DIFFERENTIAL BUS CONNECTOR

(75) Inventors: James D. Hunkins, Toronto (CA); Lawrence J. King, Newmarket (CA); Syed A. Hussain, Scarborough (CA)

(73) Assignee: ATI Technologies ULC, Markham, Ontario (CA)

( * ) Notice: Subject to any disclaimer, the term of this patent is extended or adjusted under 35 U.S.C. 154(b) by 171 days.

(21) Appl. No.: 11/955,783

(22) Filed: Dec. 13, 2007

(65) Prior Publication Data
US 2009/0157914 A1    Jun. 18, 2009

(51) Int. Cl.
*G06F 3/00* (2006.01)
*G06F 13/12* (2006.01)
*G06F 13/00* (2006.01)
(52) U.S. Cl. .................. 710/30; 710/62; 710/300
(58) Field of Classification Search .............. 710/30, 710/62, 300
See application file for complete search history.

(56) References Cited

U.S. PATENT DOCUMENTS

| | | | |
|---|---|---|---|
| 4,992,052 A | 2/1991 | Verhoeven | |
| 6,130,487 A | 10/2000 | Bertalan et al. | |
| 6,162,068 A | 12/2000 | Wu | |
| 6,171,116 B1 * | 1/2001 | Wicks et al. | 439/79 |
| 6,261,104 B1 | 7/2001 | Leman | |
| 6,338,635 B1 | 1/2002 | Lee | |
| 6,721,188 B1 | 4/2004 | Jarvis et al. | |
| 6,811,433 B2 | 11/2004 | Jou | |
| 6,884,116 B2 | 4/2005 | Suzuki et al. | |

(Continued)

FOREIGN PATENT DOCUMENTS

EP    1369958 A1    12/2003

(Continued)

OTHER PUBLICATIONS

Allen, Danny; External PCI-Express Graphics for Laptops; from www.pcworld.com; Apr. 23, 2007; pp. 2-3.

(Continued)

*Primary Examiner*—Alford W Kindred
*Assistant Examiner*—David E Martinez
(74) *Attorney, Agent, or Firm*—Vedder Price P.C.

(57) ABSTRACT

A method includes reducing power of a first graphics processor by disabling or not using its rendering engine and leaving a display engine of the same first graphics processor capable of outputting display frames from a corresponding first frame buffer to a display. A display frame is rendered by a second graphics processor while the rendering engine of the first graphics processor is in a reduced power state, such as a non-rendering state. The rendered frame is stored in a corresponding second frame buffer of the second graphics processor, such as a local frame buffer and copied from the second frame buffer to the first frame buffer. The copied frame in the first frame buffer is then displayed on a display while the rendering engine of the first graphics processor is in the reduced power state. Accordingly thermal output and power output is reduced with respect to the first graphics processor since it does not do frame generation using its rendering engine, it only uses its display engine to display frames generated by the second graphics processor.

12 Claims, 28 Drawing Sheets

U.S. PATENT DOCUMENTS

| | | |
|---|---|---|
| 7,402,084 B2 | 7/2008 | Wu |
| 2006/0174047 A1* | 8/2006 | Carty .................. 710/305 |
| 2006/0286825 A1 | 12/2006 | Ho |
| 2009/0156060 A1 | 6/2009 | Hunkins |
| 2009/0157938 A1 | 6/2009 | Hunkins et al. |

FOREIGN PATENT DOCUMENTS

| | | |
|---|---|---|
| JP | 2004014350 | 1/2004 |
| TW | 226142 B | 1/2005 |

OTHER PUBLICATIONS

Valich, Theo; External R600 and Crossfire cards are on the way; from www.theinquirer.net; Mar. 3, 2007; pp. 1-3.

PCI Express External Cabling Specification Revision 1.0; PCI-SIG; Jan. 4, 2007; pp. 1-142.

* cited by examiner

Host Side 606

| | Top row | |
|---|---|---|
| Pin # | "Receptacle (SMT)" | "Plug side shape" |
| | Connector shell | |
| T1 | CPRSNT1# | 3rd mate |
| T2 | Opt 3.3V Return <-> | 2nd mate |
| TP0 T3 | Dif Data PCIE+ | 3rd mate |
| TN0 T4 | Dif Data PCIE- | 3rd mate |
| T5 | Dif Gnd | 2nd mate |
| TP1 T6 | Dif Data PCIE+ | 3rd mate |
| TN1 T7 | Dif Data PCIE- | 3rd mate |
| T8 | Dif Gnd | 2nd mate |
| TP2 T9 | Dif Data PCIE+ | 3rd mate |
| TN2 T10 | Dif Data PCIE- | 3rd mate |
| T11 | Dif Gnd | 2nd mate |
| TP3 T12 | Dif Data PCIE+ | 3rd mate |
| TN3 T13 | Dif Data PCIE- | 3rd mate |
| T14 | Dif Gnd | 2nd mate |
| T15 | Opt 3.3V Power <-> | 3rd mate |
| T16 | Opt 3.3V Power <-> | 3rd mate |
| T17 | Opt 3.3V Power <-> | 3rd mate |
| T18 | Opt 3.3V Power <-> | 3rd mate |
| T19 | Dif Gnd | 2nd mate |
| TP4 T20 | Dif Data PCIE+ | 3rd mate |
| TN4 T21 | Dif Data PCIE- | 3rd mate |
| T22 | Dif Gnd | 2nd mate |
| TP5 T23 | Dif Data PCIE+ | 3rd mate |
| TN5 T24 | Dif Data PCIE- | 3rd mate |
| T25 | Dif Gnd | 2nd mate |
| TP6 T26 | Dif Data PCIE+ | 3rd mate |
| TN6 T27 | Dif Data PCIE- | 3rd mate |
| T28 | Dif Gnd | 2nd mate |
| TP7 T29 | Dif Data PCIE+ | 3rd mate |
| TN7 T30 | Dif Data PCIE- | 3rd mate |

| | Bottom row | | |
|---|---|---|---|
| Pin # | "Receptacle (Through hole)" | | "Plug side shape" |
| 1st mate | | | |
| B1 | SB_RTN | | 2nd mate |
| B2 | | Opt 3.3V Power | 3rd mate |
| B3 | | Opt 3.3V Return | 2nd mate |
| B4 | Dif Gnd | | 2nd mate |
| B5 | | Dif Data PCIE+ | 3rd mate |
| B6 | | Dif Data PCIE- | 3rd mate |
| B7 | Dif Gnd | | 2nd mate |
| B8 | | Dif Data PCIE+ | 3rd mate |
| B9 | | Dif Data PCIE- | 3rd mate |
| B10 | Dif Gnd | | 2nd mate |
| B11 | | Dif Data PCIE+ | 3rd mate |
| B12 | | Dif Data PCIE- | 3rd mate |
| B13 | Dif Gnd | | 2nd mate |
| B14 | | Dif Data PCIE+ | 3rd mate |
| B15 | | Dif Data PCIE- | 3rd mate |
| B16 | Dif Gnd | | 2nd mate |
| B17 | | Reserved2 <-> | 3rd mate |
| B18 | | Reserved3 <-> | 3rd mate |
| B19 | Dif Gnd | | 2nd mate |
| B20 | | Dif Data PCIE+ | 3rd mate |
| B21 | | Dif Data PCIE- | 3rd mate |
| B22 | Dif Gnd | | 2nd mate |
| B23 | | Dif Data PCIE+ | 3rd mate |
| B24 | | Dif Data PCIE- | 3rd mate |
| B25 | Dif Gnd | | 2nd mate |
| B26 | | Dif Data PCIE+ | 3rd mate |
| B27 | | Dif Data PCIE- | 3rd mate |
| B28 | Dif Gnd | | 2nd mate |
| B29 | | Dif Data PCIE+ | 3rd mate |
| B30 | | Dif Data PCIE- | 3rd mate |

FIG. 8

Downstream side 600

| Flat Cable | Pin # | "Plug side shape" | "Receptacle (Through hole)" | |
|---|---|---|---|---|
| | | | Bottom row | |
| | | Connector shell | | |
| ------------ | B62 | 2nd mate | | SB_RTN |
| | B61 | 3rd mate | Opt 3.3V Power | |
| | B60 | 2nd mate | Opt 3.3V Return | |
| ------------ | B59 | 2nd mate | | Dif Gnd |
| RP0 | B58 | 3rd mate | Dif Data PCIE+ | |
| RN0 | B57 | 3rd mate | Dif Data PCIE- | |
| ------------ | B56 | 2nd mate | | Dif Gnd |
| RP1 | B55 | 3rd mate | Dif Data PCIE+ | |
| RN1 | B54 | 3rd mate | Dif Data PCIE- | |
| ------------ | B53 | 2nd mate | | Dif Gnd |
| RP2 | B52 | 3rd mate | Dif Data PCIE+ | |
| RN2 | B51 | 3rd mate | Dif Data PCIE- | |
| ------------ | B50 | 2nd mate | | Dif Gnd |
| RP3 | B49 | 3rd mate | Dif Data PCIE+ | |
| RN3 | B48 | 3rd mate | Dif Data PCIE- | |
| ------------ | B47 | 2nd mate | | Dif Gnd |
| ------------ | B46 | 3rd mate | Reserved2 <-> | |
| ------------ | B45 | 3rd mate | Reserved3 <-> | |
| ------------ | B44 | 2nd mate | | Dif Gnd |
| RP4 | B43 | 3rd mate | Dif Data PCIE+ | |
| RN4 | B42 | 3rd mate | Dif Data PCIE- | |
| ------------ | B41 | 2nd mate | | Dif Gnd |
| RP5 | B40 | 3rd mate | Dif Data PCIE+ | |
| RN5 | B39 | 3rd mate | Dif Data PCIE- | |
| ------------ | B38 | 2nd mate | | Dif Gnd |
| RP6 | B37 | 3rd mate | Dif Data PCIE+ | |
| RN6 | B36 | 3rd mate | Dif Data PCIE- | |
| ------------ | B35 | 2nd mate | | Dif Gnd |
| RP7 | B34 | 3rd mate | Dif Data PCIE+ | |
| RN7 | B33 | 3rd mate | Dif Data PCIE- | |

| Top row | | | |
|---|---|---|---|
| Pin # | "Plug side shape" | "Receptacle (SMT)" | |
| 1st mate | | | |
| T62 | 3rd mate | CPRSNT1# | |
| T61 | 2nd mate | Opt 3.3V Return <-> | |
| T60 | 3rd mate | Dif Data PCIE+ | TP0 |
| T59 | 3rd mate | Dif Data PCIE- | TN0 |
| T58 | 2nd mate | Dif Gnd | |
| T57 | 3rd mate | Dif Data PCIE+ | TP1 |
| T56 | 3rd mate | Dif Data PCIE- | TN1 |
| T55 | 2nd mate | Dif Gnd | |
| T54 | 3rd mate | Dif Data PCIE+ | TP2 |
| T53 | 3rd mate | Dif Data PCIE- | TN2 |
| T52 | 2nd mate | Dif Gnd | |
| T51 | 3rd mate | Dif Data PCIE+ | TP3 |
| T50 | 3rd mate | Dif Data PCIE- | TP4 |
| T49 | 2nd mate | Dif Gnd | |
| T48 | 3rd mate | Opt 3.3V Power <-> | |
| T47 | 3rd mate | Opt 3.3V Power <-> | |
| T46 | 3rd mate | Opt 3.3V Power <-> | |
| T45 | 3rd mate | Opt 3.3V Power <-> | |
| T44 | 2nd mate | Dif Gnd | |
| T43 | 3rd mate | Dif Data PCIE+ | TP4 |
| T42 | 3rd mate | Dif Data PCIE- | TN4 |
| T41 | 2nd mate | Dif Gnd | |
| T40 | 3rd mate | Dif Data PCIE+ | TP5 |
| T39 | 3rd mate | Dif Data PCIE- | TN5 |
| T38 | 2nd mate | Dif Gnd | |
| T37 | 3rd mate | Dif Data PCIE+ | TP6 |
| T36 | 3rd mate | Dif Data PCIE- | TN6 |
| T35 | 2nd mate | Dif Gnd | |
| T34 | 3rd mate | Dif Data PCIE+ | TP7 |
| T33 | 3rd mate | Dif Data PCIE- | TN7 |

FIG. 10

|  | T31 | Opt 3.3V Return | 2nd mate |
|  | T32 | Opt 3.3V Return | 2nd mate |
| TP8 | T33 | Dif Data PCIE+ | 3rd mate |
| TN8 | T34 | Dif Data PCIE- | 3rd mate |
|  | T35 | Dif Gnd | 2nd mate |
| TP9 | T36 | Dif Data PCIE+ | 3rd mate |
| TN9 | T37 | Dif Data PCIE- | 3rd mate |
|  | T38 | Dif Gnd | 2nd mate |
| TP10 | T39 | Dif Data PCIE+ | 3rd mate |
| TN10 | T40 | Dif Data PCIE- | 3rd mate |
|  | T41 | Dif Gnd | 2nd mate |
| TP11 | T42 | Dif Data PCIE+ | 3rd mate |
| TN11 | T43 | Dif Data PCIE- | 3rd mate |
|  | T44 | Dif Gnd | 2nd mate |
|  | T45 | Reserved | 3rd mate |
|  | T46 | CPERST | 3rd mate |
|  | T47 | CPWRON | 3rd mate |
|  | T48 | CWAKE | 3rd mate |
|  | T49 | Dif Gnd | 2nd mate |
| TP12 | T50 | Dif Data PCIE+ | 3rd mate |
| TN12 | T51 | Dif Data PCIE- | 3rd mate |
|  | T52 | Dif Gnd | 2nd mate |
| TP13 | T53 | Dif Data PCIE+ | 3rd mate |
| TN13 | T54 | Dif Data PCIE- | 3rd mate |
|  | T55 | Dif Gnd | 2nd mate |
| TP14 | T56 | Dif Data PCIE+ | 3rd mate |
| TN14 | T57 | Dif Data PCIE- | 3rd mate |
|  | T58 | Dif Gnd | 2nd mate |
| TP15 | T59 | Dif Data PCIE+ | 3rd mate |
| TN15 | T60 | Dif Data PCIE- | 3rd mate |
|  | T61 | Opt 3.3V Return <-> | 2nd mate |
|  | T62 | CPRSNT2# | 3rd mate |
|  | Connector shell | | |

Transmitters

FIG. 11

| | | | |
|---|---|---|---|
| B31 | Dif Gnd | | 2nd mate |
| B32 | Dif Gnd | | 2nd mate |
| B33 | | Dif Data PCIE+ | 3rd mate |
| B34 | | Dif Data PCIE- | 3rd mate |
| B35 | Dif Gnd | | 2nd mate |
| B36 | | Dif Data PCIE+ | 3rd mate |
| B37 | | Dif Data PCIE- | 3rd mate |
| B38 | Dif Gnd | | 2nd mate |
| B39 | | Dif Data PCIE+ | 3rd mate |
| B40 | | Dif Data PCIE- | 3rd mate |
| B41 | Dif Gnd | | 2nd mate |
| B42 | | Dif Data PCIE+ | 3rd mate |
| B43 | | Dif Data PCIE- | 3rd mate |
| B44 | Dif Gnd | | 2nd mate |
| B45 | | Dif Clock <-> | 3rd mate |
| B46 | | Dif Clock <-> | 3rd mate |
| B47 | Dif Gnd | | 2nd mate |
| B48 | | Dif Data PCIE+ | 3rd mate |
| B49 | | Dif Data PCIE- | 3rd mate |
| B50 | Dif Gnd | | 2nd mate |
| B51 | | Dif Data PCIE+ | 3rd mate |
| B52 | | Dif Data PCIE- | 3rd mate |
| B53 | Dif Gnd | | 2nd mate |
| B54 | | Dif Data PCIE+ | 3rd mate |
| B55 | | Dif Data PCIE- | 3rd mate |
| B56 | Dif Gnd | | 2nd mate |
| B57 | | Dif Data PCIE+ | 3rd mate |
| B58 | | Dif Data PCIE- | 3rd mate |
| B59 | Dif Gnd | | 2nd mate |
| B60 | | Opt 3.3V Return | 2nd mate |
| B61 | | Opt 3.3V Power | 3rd mate |
| B62 | SB_RTN | | 2nd mate |
| 1st mate | | | |

Receivers

FIG. 12

|  | B32 | 2nd mate |  | Dif Gnd |
|---|---|---|---|---|
|  | B31 | 2nd mate |  | Dif Gnd |
| RP8 | B30 | 3rd mate | Dif Data PCIE+ |  |
| RN8 | B29 | 3rd mate | Dif Data PCIE- |  |
|  | B28 | 2nd mate |  | Dif Gnd |
| RP9 | B27 | 3rd mate | Dif Data PCIE+ |  |
| RN9 | B26 | 3rd mate | Dif Data PCIE- |  |
|  | B25 | 2nd mate |  | Dif Gnd |
| RP10 | B24 | 3rd mate | Dif Data PCIE+ |  |
| RN10 | B23 | 3rd mate | Dif Data PCIE- |  |
|  | B22 | 2nd mate |  | Dif Gnd |
| RP11 | B21 | 3rd mate | Dif Data PCIE+ |  |
| RN11 | B20 | 3rd mate | Dif Data PCIE- |  |
|  | B19 | 2nd mate |  | Dif Gnd |
| DifClkP | B18 | 3rd mate | Dif Clock <-> |  |
| DifClkN | B17 | 3rd mate | Dif Clock <-> |  |
|  | B16 | 2nd mate |  | Dif Gnd |
| RP12 | B15 | 3rd mate | Dif Data PCIE+ |  |
| RN12 | B14 | 3rd mate | Dif Data PCIE- |  |
|  | B13 | 2nd mate |  | Dif Gnd |
| RP13 | B12 | 3rd mate | Dif Data PCIE+ |  |
| RN13 | B11 | 3rd mate | Dif Data PCIE- |  |
|  | B10 | 2nd mate |  | Dif Gnd |
| RP14 | B9 | 3rd mate | Dif Data PCIE+ |  |
| RN14 | B8 | 3rd mate | Dif Data PCIE- |  |
|  | B7 | 2nd mate |  | Dif Gnd |
| RP15 | B6 | 3rd mate | Dif Data PCIE+ |  |
| RN15 | B5 | 3rd mate | Dif Data PCIE- |  |
|  | B4 | 2nd mate |  | Dif Gnd |
|  | B3 | 2nd mate | Opt 3.3V Return |  |
|  | B2 | 3rd mate | Opt 3.3V Power |  |
|  | B1 | 2nd mate |  | SB_RTN |
|  | Connector shell ||||
|  | Receivers (Trans on GPU) ||||

FIG. 13

| | | | |
|---|---|---|---|
| T32 | 2nd mate | Opt 3.3V Return | |
| T31 | 2nd mate | Opt 3.3V Return | |
| T30 | 3rd mate | Dif Data PCIE+ | TP8 |
| T29 | 3rd mate | Dif Data PCIE- | TN8 |
| T28 | 2nd mate | Dif Gnd | |
| T27 | 3rd mate | Dif Data PCIE+ | TP9 |
| T26 | 3rd mate | Dif Data PCIE- | TN9 |
| T25 | 2nd mate | Dif Gnd | |
| T24 | 3rd mate | Dif Data PCIE+ | TP10 |
| T23 | 3rd mate | Dif Data PCIE- | TN10 |
| T22 | 2nd mate | Dif Gnd | |
| T21 | 3rd mate | Dif Data PCIE+ | TP11 |
| T20 | 3rd mate | Dif Data PCIE- | TN11 |
| T19 | 2nd mate | Dif Gnd | |
| T18 | 3rd mate | Reserved1 <-> | |
| T17 | 3rd mate | CPERST# <-> | |
| T16 | 3rd mate | CPWRON <-> | |
| T15 | 3rd mate | CWAKE# <-> | |
| T14 | 2nd mate | Dif Gnd | |
| T13 | 3rd mate | Dif Data PCIE+ | TP12 |
| T12 | 3rd mate | Dif Data PCIE- | TN12 |
| T11 | 2nd mate | Dif Gnd | |
| T10 | 3rd mate | Dif Data PCIE+ | TP13 |
| T9 | 3rd mate | Dif Data PCIE- | TN13 |
| T8 | 2nd mate | Dif Gnd | |
| T7 | 3rd mate | Dif Data PCIE+ | TP14 |
| T6 | 3rd mate | Dif Data PCIE- | TN14 |
| T5 | 2nd mate | Dif Gnd | |
| T4 | 3rd mate | Dif Data PCIE+ | TP15 |
| T3 | 3rd mate | Dif Data PCIE- | TN15 |
| T2 | 2nd mate | Opt 3.3V Return <-> | |
| T1 | 3rd mate | CPRSNT2# | |
| | 1st mate | | |

Transmitters (Rec on GPU)

FIG. 14

Host Side

702

| | Pin # | "Receptacle (SMT)" | "Plug side shape" |
|---|---|---|---|
| | | Top row | |
| | | Connector shell | |
| | T1 | CPRSNT1# | 3rd mate |
| | T2 | Opt 3.3V Return <-> | 3rd mate |
| | T3 | Gnd | 2nd mate |
| TP0 | T4 | Dif Data PCIE+ | 3rd mate |
| TN0 | T5 | Dif Data PCIE- | 3rd mate |
| | T6 | Dif Gnd | 2nd mate |
| TP1 | T7 | Dif Data PCIE+ | 3rd mate |
| TN1 | T8 | Dif Data PCIE- | 3rd mate |
| | T9 | Dif Gnd | 2nd mate |
| TP2 | T10 | Dif Data PCIE+ | 3rd mate |
| TN2 | T11 | Dif Data PCIE- | 3rd mate |
| | T12 | Dif Gnd | 2nd mate |
| TP3 | T13 | Dif Data PCIE+ | 3rd mate |
| TN3 | T14 | Dif Data PCIE- | 3rd mate |
| | T15 | Dif Gnd | 2nd mate |
| | T16 | Reserved1 <-> | 3rd mate |
| | T17 | CPERST# <-> | 3rd mate |
| | T18 | CPWRON <-> | 3rd mate |
| | T19 | CWAKE# <-> | 3rd mate |
| | T20 | Dif Gnd | 2nd mate |
| TP4 | T21 | Dif Data PCIE+ | 3rd mate |
| TN4 | T22 | Dif Data PCIE- | 3rd mate |
| | T23 | Dif Gnd | 2nd mate |
| TP5 | T24 | Dif Data PCIE+ | 3rd mate |
| TN5 | T25 | Dif Data PCIE- | 3rd mate |
| | T26 | Dif Gnd | 2nd mate |
| TP6 | T27 | Dif Data PCIE+ | 3rd mate |
| TN6 | T28 | Dif Data PCIE- | 3rd mate |
| | T29 | Dif Gnd | 2nd mate |
| TP7 | T30 | Dif Data PCIE+ | 3rd mate |
| TN7 | T31 | Dif Data PCIE- | 3rd mate |
| | T32 | Gnd | 2nd mate |
| | T33 | Opt 3.3V Power <-> | 3rd mate |
| | T34 | CPRSNT2# | 3rd mate |
| | | Connector shell | |

Transmitters

FIG. 15

| Bottom row | | |
|---|---|---|
| Pin # | "Receptacle (Through hole)" | "Plug side shape" |
| 1st mate | | |
| B1 | SB_RTN | 2nd mate |
| B2 | Opt 3.3V Power | 3rd mate |
| B3 | Opt 3.3V Return | 2nd mate |
| B4 | Dif Gnd | 2nd mate |
| B5 | Dif Data PCIE+ | 3rd mate |
| B6 | Dif Data PCIE- | 3rd mate |
| B7 | Dif Gnd | 2nd mate |
| B8 | Dif Data PCIE+ | 3rd mate |
| B9 | Dif Data PCIE- | 3rd mate |
| B10 | Dif Gnd | 2nd mate |
| B11 | Dif Data PCIE+ | 3rd mate |
| B12 | Dif Data PCIE- | 3rd mate |
| B13 | Dif Gnd | 2nd mate |
| B14 | Dif Data PCIE+ | 3rd mate |
| B15 | Dif Data PCIE- | 3rd mate |
| B16 | Dif Gnd | 2nd mate |
| B17 | Dif Clock | 3rd mate |
| B18 | Dif Clock | 3rd mate |
| B19 | Dif Gnd | 2nd mate |
| B20 | Dif Data PCIE+ | 3rd mate |
| B21 | Dif Data PCIE- | 3rd mate |
| B22 | Dif Gnd | 2nd mate |
| B23 | Dif Data PCIE+ | 3rd mate |
| B24 | Dif Data PCIE- | 3rd mate |
| B25 | Dif Gnd | 2nd mate |
| B26 | Dif Data PCIE+ | 3rd mate |
| B27 | Dif Data PCIE- | 3rd mate |
| B28 | Dif Gnd | 2nd mate |
| B29 | Dif Data PCIE+ | 3rd mate |
| B30 | Dif Data PCIE- | 3rd mate |
| B31 | Dif Gnd | 2nd mate |
| B32 | Opt 3.3V Return | 2nd mate |
| B33 | Opt 3.3V Power | 3rd mate |
| B34 | SB_RTN | 2nd mate |
| 1st mate | | |

Receivers

FIG. 16

| | | Downstream side | | 704 |
|---|---|---|---|---|
| 706 | | Bottom row | | |
| | Pin # | "Plug side shape" | "Receptacle (Through hole)" | |
| Cable | | | Connector shell | |
| ------------- | B34 | 2nd mate | | SB_RTN |
| | B33 | 3rd mate | Opt 3.3V Power | |
| | B32 | 2nd mate | Opt 3.3V Return | |
| ------------- | B31 | 2nd mate | | Dif Gnd |
| RP0 | B30 | 3rd mate | Dif Data PCIE+ | |
| RN0 | B29 | 3rd mate | Dif Data PCIE- | |
| ------------- | B28 | 2nd mate | | Dif Gnd |
| RP1 | B27 | 3rd mate | Dif Data PCIE+ | |
| RN1 | B26 | 3rd mate | Dif Data PCIE- | |
| ------------- | B25 | 2nd mate | | Dif Gnd |
| RP2 | B24 | 3rd mate | Dif Data PCIE+ | |
| RN2 | B23 | 3rd mate | Dif Data PCIE- | |
| ------------- | B22 | 2nd mate | | Dif Gnd |
| RP3 | B21 | 3rd mate | Dif Data PCIE+ | |
| RN3 | B20 | 3rd mate | Dif Data PCIE- | |
| ------------- | B19 | 2nd mate | | Dif Gnd |
| DifClkP | B18 | 3rd mate | Dif Clock | |
| DifClkN | B17 | 3rd mate | Dif Clock | |
| ------------- | B16 | 2nd mate | | Dif Gnd |
| RP4 | B15 | 3rd mate | Dif Data PCIE+ | |
| RN4 | B14 | 3rd mate | Dif Data PCIE- | |
| ------------- | B13 | 2nd mate | | Dif Gnd |
| RP5 | B12 | 3rd mate | Dif Data PCIE+ | |
| RN5 | B11 | 3rd mate | Dif Data PCIE- | |
| ------------- | B10 | 2nd mate | | Dif Gnd |
| RP6 | B9 | 3rd mate | Dif Data PCIE+ | |
| RN6 | B8 | 3rd mate | Dif Data PCIE- | |
| ------------- | B7 | 2nd mate | | Dif Gnd |
| RP7 | B6 | 3rd mate | Dif Data PCIE+ | |
| RN7 | B5 | 3rd mate | Dif Data PCIE- | |
| ------------- | B4 | 2nd mate | | Dif Gnd |
| | B3 | 2nd mate | Opt 3.3V Return | |
| | B2 | 3rd mate | Opt 3.3V Power | |
| ------------- | B1 | 2nd mate | | SB_RTN |
| | | | Connector shell | |
| Receivers (Trans on GPU) | | | | |

FIG. 17

| Top row | | | |
|---|---|---|---|
| Pin # | "Plug side shape" | "Receptacle (SMT)" | |
| 1st mate | | | |
| T34 | 3rd mate | CPRSNT1# | |
| T33 | 3rd mate | Opt 3.3V Return <-> | |
| T32 | 2nd mate | Gnd | |
| T31 | 3rd mate | Dif Data PCIE+ | TP0 |
| T30 | 3rd mate | Dif Data PCIE- | TN0 |
| T29 | 2nd mate | Dif Gnd | |
| T28 | 3rd mate | Dif Data PCIE+ | TP1 |
| T27 | 3rd mate | Dif Data PCIE- | TN1 |
| T26 | 2nd mate | Dif Gnd | |
| T25 | 3rd mate | Dif Data PCIE+ | TP2 |
| T24 | 3rd mate | Dif Data PCIE- | TN2 |
| T23 | 2nd mate | Dif Gnd | |
| T22 | 3rd mate | Dif Data PCIE+ | TP3 |
| T21 | 3rd mate | Dif Data PCIE- | TP4 |
| T20 | 2nd mate | Dif Gnd | |
| T19 | 3rd mate | Reserved1 <-> | |
| T18 | 3rd mate | CPERST# <-> | |
| T17 | 3rd mate | CPWRON <-> | |
| T16 | 3rd mate | CWAKE# <-> | |
| T15 | 2nd mate | Dif Gnd | |
| T14 | 3rd mate | Dif Data PCIE+ | TP4 |
| T13 | 3rd mate | Dif Data PCIE- | TN4 |
| T12 | 2nd mate | Dif Gnd | |
| T11 | 3rd mate | Dif Data PCIE+ | TP5 |
| T10 | 3rd mate | Dif Data PCIE- | TN5 |
| T9 | 2nd mate | Dif Gnd | |
| T8 | 3rd mate | Dif Data PCIE+ | TP6 |
| T7 | 3rd mate | Dif Data PCIE- | TN6 |
| T6 | 2nd mate | Dif Gnd | |
| T5 | 3rd mate | Dif Data PCIE+ | TP7 |
| T4 | 3rd mate | Dif Data PCIE- | TN7 |
| T3 | 2nd mate | Gnd | |
| T2 | 3rd mate | Opt 3.3V Power <-> | |
| T1 | 3rd mate | CPRSNT2# | |
| 1st mate | | | |

Transmitters (Rec on GPU)

FIG. 18

|  | | Connector shell | |
|---|---|---|---|
| ⌊__ | T1 | CPRSNT1# | 3rd mate |
|  | T2 | Opt 3.3V Return <-> | 3rd mate |
| -------- | T3 | Gnd | 2nd mate |
| TP0 | T4 | Dif Data PCIE+ | 3rd mate |
| TN0 | T5 | Dif Data PCIE- | 3rd mate |
| -------- | T6 | Dif Gnd | 2nd mate |
| TP1 | T7 | Dif Data PCIE+ | 3rd mate |
| TN1 | T8 | Dif Data PCIE- | 3rd mate |
| -------- | T9 | Dif Gnd | 2nd mate |
| TP2 | T10 | Dif Data PCIE+ | 3rd mate |
| TN2 | T11 | Dif Data PCIE- | 3rd mate |
| -------- | T12 | Dif Gnd | 2nd mate |
| TP3 | T13 | Dif Data PCIE+ | 3rd mate |
| TN3 | T14 | Dif Data PCIE- | 3rd mate |
| -------- | T15 | Dif Gnd | 2nd mate |
| -------- | T16 | Reserved1 <-> | 3rd mate |
| -------- | T17 | CPERST# <-> | 3rd mate |
| -------- | T18 | CPWRON <-> | 3rd mate |
| -------- | T19 | CWAKE# <-> | 3rd mate |
| -------- | T20 | Dif Gnd | 2nd mate |
| TP4 | T21 | Dif Data PCIE+ | 3rd mate |
| TN4 | T22 | Dif Data PCIE- | 3rd mate |
| -------- | T23 | Dif Gnd | 2nd mate |
| TP5 | T24 | Dif Data PCIE+ | 3rd mate |
| TN5 | T25 | Dif Data PCIE- | 3rd mate |
| -------- | T26 | Dif Gnd | 2nd mate |
| TP6 | T27 | Dif Data PCIE+ | 3rd mate |
| TN6 | T28 | Dif Data PCIE- | 3rd mate |
| -------- | T29 | Dif Gnd | 2nd mate |
| TP7 | T30 | Dif Data PCIE+ | 3rd mate |
| TN7 | T31 | Dif Data PCIE- | 3rd mate |
| -------- | T32 | Gnd | 2nd mate |
|  | T33 | Opt 3.3V Power <-> | 3rd mate |
| -------- | T34 | CPRSNT2# | 3rd mate |
|  |  | Connector shell |  |

Transmitters

| 1st mate | | | Flat Cable |
|---|---|---|---|
| B1 SB_RTN | | 2nd mate | |
| B2 | Opt 3.3V Power | 3rd mate | |
| B3 | Opt 3.3V Return | 2nd mate | |
| B4 Dif Gnd | | 2nd mate | -------- |
| B5 | Dif Data PCIE+ | 3rd mate | RP0 |
| B6 | Dif Data PCIE- | 3rd mate | RN0 |
| B7 Dif Gnd | | 2nd mate | -------- |
| B8 | Dif Data PCIE+ | 3rd mate | RP1 |
| B9 | Dif Data PCIE- | 3rd mate | RN1 |
| B10 Dif Gnd | | 2nd mate | -------- |
| B11 | Dif Data PCIE+ | 3rd mate | RP2 |
| B12 | Dif Data PCIE- | 3rd mate | RN2 |
| B13 Dif Gnd | | 2nd mate | -------- |
| B14 | Dif Data PCIE+ | 3rd mate | RP3 |
| B15 | Dif Data PCIE- | 3rd mate | RN3 |
| B16 Dif Gnd | | 2nd mate | -------- |
| B17 | Dif Clock | 3rd mate | DifClkP |
| B18 | Dif Clock | 3rd mate | DifClkN |
| B19 Dif Gnd | | 2nd mate | -------- |
| B20 | Dif Data PCIE+ | 3rd mate | RP4 |
| B21 | Dif Data PCIE- | 3rd mate | RN4 |
| B22 Dif Gnd | | 2nd mate | -------- |
| B23 | Dif Data PCIE+ | 3rd mate | RP5 |
| B24 | Dif Data PCIE- | 3rd mate | RN5 |
| B25 Dif Gnd | | 2nd mate | -------- |
| B26 | Dif Data PCIE+ | 3rd mate | RP6 |
| B27 | Dif Data PCIE- | 3rd mate | RN6 |
| B28 Dif Gnd | | 2nd mate | -------- |
| B29 | Dif Data PCIE+ | 3rd mate | RP7 |
| B30 | Dif Data PCIE- | 3rd mate | RN7 |
| B31 Dif Gnd | | 2nd mate | -------- |
| B32 | Opt 3.3V Return | 2nd mate | |
| B33 | Opt 3.3V Power | 3rd mate | |
| B34 SB_RTN | | 2nd mate | |
| | 1st mate | | |

Receivers

FIG. 20

Downstream side   ←600

| Bottom Row | | | | | |
|---|---|---|---|---|---|
| Pin # | "From Pin #" | "Plug side shape" | \multicolumn{2}{c}{"Receptacle (Through hole)"} | |
| | | | Connector shell | | |
| B62 | B1 | 2nd mate | | SB_RTN | 1 |
| B61 | L | 3rd mate | Opt 3.3V Power | | 2 |
| B60 | L | 2nd mate | Opt 3.3V Return | | 3 |
| B59 | L | 2nd mate | | Dif Gnd | 4 |
| B58 | L | 3rd mate | Dif Data PCIE+ | | 5 |
| B57 | L | 3rd mate | Dif Data PCIE- | | 6 |
| B56 | L | 2nd mate | | Dif Gnd | 7 |
| B55 | L | 3rd mate | Dif Data PCIE+ | | 8 |
| B54 | L | 3rd mate | Dif Data PCIE- | | 9 |
| B53 | L | 2nd mate | | Dif Gnd | 10 |
| B52 | L | 3rd mate | Dif Data PCIE+ | | 11 |
| B51 | L | 3rd mate | Dif Data PCIE- | | 12 |
| B50 | L | 2nd mate | | Dif Gnd | 13 |
| B49 | L | 3rd mate | Dif Data PCIE+ | | 14 |
| B48 | L | 3rd mate | Dif Data PCIE- | | 15 |
| B47 | L | 2nd mate | | Dif Gnd | 16 |
| B46 | L | 3rd mate | Reserved2 <-> | | 17 |
| B45 | L | 3rd mate | Reserved3 <-> | | 18 |
| B44 | L | 2nd mate | | Dif Gnd | 19 |
| B43 | L | 3rd mate | Dif Data PCIE+ | | 20 |
| B42 | L | 3rd mate | Dif Data PCIE- | | 21 |
| B41 | L | 2nd mate | | Dif Gnd | 22 |
| B40 | L | 3rd mate | Dif Data PCIE+ | | 23 |
| B39 | L | 3rd mate | Dif Data PCIE- | | 24 |

| Top Row | | | | |
|---|---|---|---|---|
| Pin # | "From Pin #" | "Plug side shape" | "Receptacle (SMT)" | |
| | | 1st Mate | | |
| T62 | T1 | 3rd mate | CPRSNT1# | |
| T61 | L | 2nd mate | Opt 3.3V Return <-> | |
| T60 | L | 3rd mate | Dif Data PCIE+ | TP0 |
| T59 | L | 3rd mate | Dif Data PCIE- | TN0 |
| T58 | L | 2nd mate | Dif Gnd | |
| T57 | L | 3rd mate | Dif Data PCIE+ | TP1 |
| T56 | L | 3rd mate | Dif Data PCIE- | TN1 |
| T55 | L | 2nd mate | Dif Gnd | |
| T54 | L | 3rd mate | Dif Data PCIE+ | TP2 |
| T53 | L | 3rd mate | Dif Data PCIE- | TN2 |
| T52 | L | 2nd mate | Dif Gnd | |
| T51 | L | 3rd mate | Dif Data PCIE+ | TP3 |
| T50 | L | 3rd mate | Dif Data PCIE- | TP4 |
| T49 | L | 2nd mate | Dif Gnd | |
| T48 | L | 3rd mate | Opt 3.3V Power <-> | |
| T47 | L | 3rd mate | Opt 3.3V Power <-> | |
| T46 | L | 3rd mate | Opt 3.3V Power <-> | |
| T45 | L | 3rd mate | Opt 3.3V Power <-> | |
| T44 | L | 2nd mate | Dif Gnd | |
| T43 | L | 3rd mate | Dif Data PCIE+ | TP4 |
| T42 | L | 3rd mate | Dif Data PCIE- | TN4 |
| T41 | L | 2nd mate | Dif Gnd | |
| T40 | L | 3rd mate | Dif Data PCIE+ | TP5 |
| T39 | L | 3rd mate | Dif Data PCIE- | TN5 |

FIG. 22

| | | | | | |
|---|---|---|---|---|---|
| B38 | L | 2nd mate | | Dif Gnd | 25 |
| B37 | L | 3rd mate | Dif Data PCIE+ | | 26 |
| B36 | L | 3rd mate | Dif Data PCIE- | | 27 |
| B35 | L | 2nd mate | | Dif Gnd | 28 |
| B34 | L | 3rd mate | Dif Data PCIE+ | | 29 |
| B33 | L | 3rd mate | Dif Data PCIE- | | 30 |
| B32 | L | 2nd mate | | Dif Gnd | 31 |
| B31 | B4 | 2nd mate | | Dif Gnd | 32 |
| B30 | B5 | 3rd mate | Dif Data PCIE+ | | 33 |
| B29 | B6 | 3rd mate | Dif Data PCIE- | | 34 |
| B28 | B7 | 2nd mate | | Dif Gnd | 35 |
| B27 | B8 | 3rd mate | Dif Data PCIE+ | | 36 |
| B26 | B9 | 3rd mate | Dif Data PCIE- | | |
| B25 | B10 | 2nd mate | | Dif Gnd | |
| B24 | B11 | 3rd mate | Dif Data PCIE+ | | |
| B23 | B12 | 3rd mate | Dif Data PCIE- | | |
| B22 | B13 | 2nd mate | | Dif Gnd | |
| B21 | B14 | 3rd mate | Dif Data PCIE+ | | |
| B20 | B15 | 3rd mate | Dif Data PCIE- | | |
| B19 | B16 | 2nd mate | | Dif Gnd | |
| B18 | B17 | 3rd mate | Dif Clock <-> | | |
| B17 | B18 | 3rd mate | Dif Clock <-> | | |
| B16 | B19 | 2nd mate | | Dif Gnd | |
| B15 | B20 | 3rd mate | Dif Data PCIE+ | | |
| B14 | B21 | 3rd mate | Dif Data PCIE- | | |
| B13 | B22 | 2nd mate | | Dif Gnd | |
| B12 | B23 | 3rd mate | Dif Data PCIE+ | | |
| B11 | B24 | 3rd mate | Dif Data PCIE- | | |
| B10 | B25 | 2nd mate | | Dif Gnd | |
| B9 | B26 | 3rd mate | Dif Data PCIE+ | | |
| B8 | B27 | 3rd mate | Dif Data PCIE- | | |
| B7 | B28 | 2nd mate | | Dif Gnd | |
| B6 | B29 | 3rd mate | Dif Data PCIE+ | | |
| B5 | B30 | 3rd mate | Dif Data PCIE- | | |
| B4 | B31 | 2nd mate | | Dif Gnd | |
| B3 | L | 2nd mate | Opt 3.3V Return | | |
| B2 | L | 3rd mate | Opt 3.3V Power | | |
| B1 | B34 | 2nd mate | | SB_RTN | |
| | | | Connector shell | | |

Receivers (Trans on GPU)

FIG. 23

| | | | | |
|---|---|---|---|---|
| T38 | L | 2nd mate | Dif Gnd | |
| T37 | L | 3rd mate | Dif Data PCIE+ | TP6 |
| T36 | L | 3rd mate | Dif Data PCIE- | TN6 |
| T35 | L | 2nd mate | Dif Gnd | |
| T34 | L | 3rd mate | Dif Data PCIE+ | TP7 |
| T33 | L | 3rd mate | Dif Data PCIE- | TN7 |
| T32 | L | 2nd mate | Opt 3.3V Return | |
| T31 | L | 2nd mate | Opt 3.3V Return | |
| T30 | T4 | 3rd mate | Dif Data PCIE+ | TP8 |
| T29 | T5 | 3rd mate | Dif Data PCIE- | TN8 |
| T28 | T6 | 2nd mate | Dif Gnd | |
| T27 | T7 | 3rd mate | Dif Data PCIE+ | TP9 |
| T26 | T8 | 3rd mate | Dif Data PCIE- | TN9 |
| T25 | T9 | 2nd mate | Dif Gnd | |
| T24 | T10 | 3rd mate | Dif Data PCIE+ | TP10 |
| T23 | T11 | 3rd mate | Dif Data PCIE- | TN10 |
| T22 | T12 | 2nd mate | Dif Gnd | |
| T21 | T13 | 3rd mate | Dif Data PCIE+ | TP11 |
| T20 | T14 | 3rd mate | Dif Data PCIE- | TN11 |
| T19 | T15 | 2nd mate | Dif Gnd | |
| T18 | T16 | 3rd mate | Reserved1 <-> | |
| T17 | T17 | 3rd mate | CPERST# <-> | |
| T16 | T18 | 3rd mate | CPWRON <-> | |
| T15 | T19 | 3rd mate | CWAKE# <-> | |
| T14 | T20 | 2nd mate | Dif Gnd | |
| T13 | T21 | 3rd mate | Dif Data PCIE+ | TP12 |
| T12 | T22 | 3rd mate | Dif Data PCIE- | TN12 |
| T11 | T23 | 2nd mate | Dif Gnd | |
| T10 | T24 | 3rd mate | Dif Data PCIE+ | TP13 |
| T9 | T25 | 3rd mate | Dif Data PCIE- | TN13 |
| T8 | T26 | 2nd mate | Dif Gnd | |
| T7 | T27 | 3rd mate | Dif Data PCIE+ | TP14 |
| T6 | T28 | 3rd mate | Dif Data PCIE- | TN14 |
| T5 | T29 | 2nd mate | Dif Gnd | |
| T4 | T30 | 3rd mate | Dif Data PCIE+ | TP15 |
| T3 | T31 | 3rd mate | Dif Data PCIE- | TN15 |
| T2 | L | 2nd mate | Opt 3.3V Return <-> | |
| T1 | T34 | 3rd mate | CPRSNT2# | |
| | | 1st Mate | | |

Rows labeled Reserved1, CPERST#, CPWRON, CWAKE# are CONTROL SIGNALS.

Transmitters (Rec on GPU)

FIG. 24

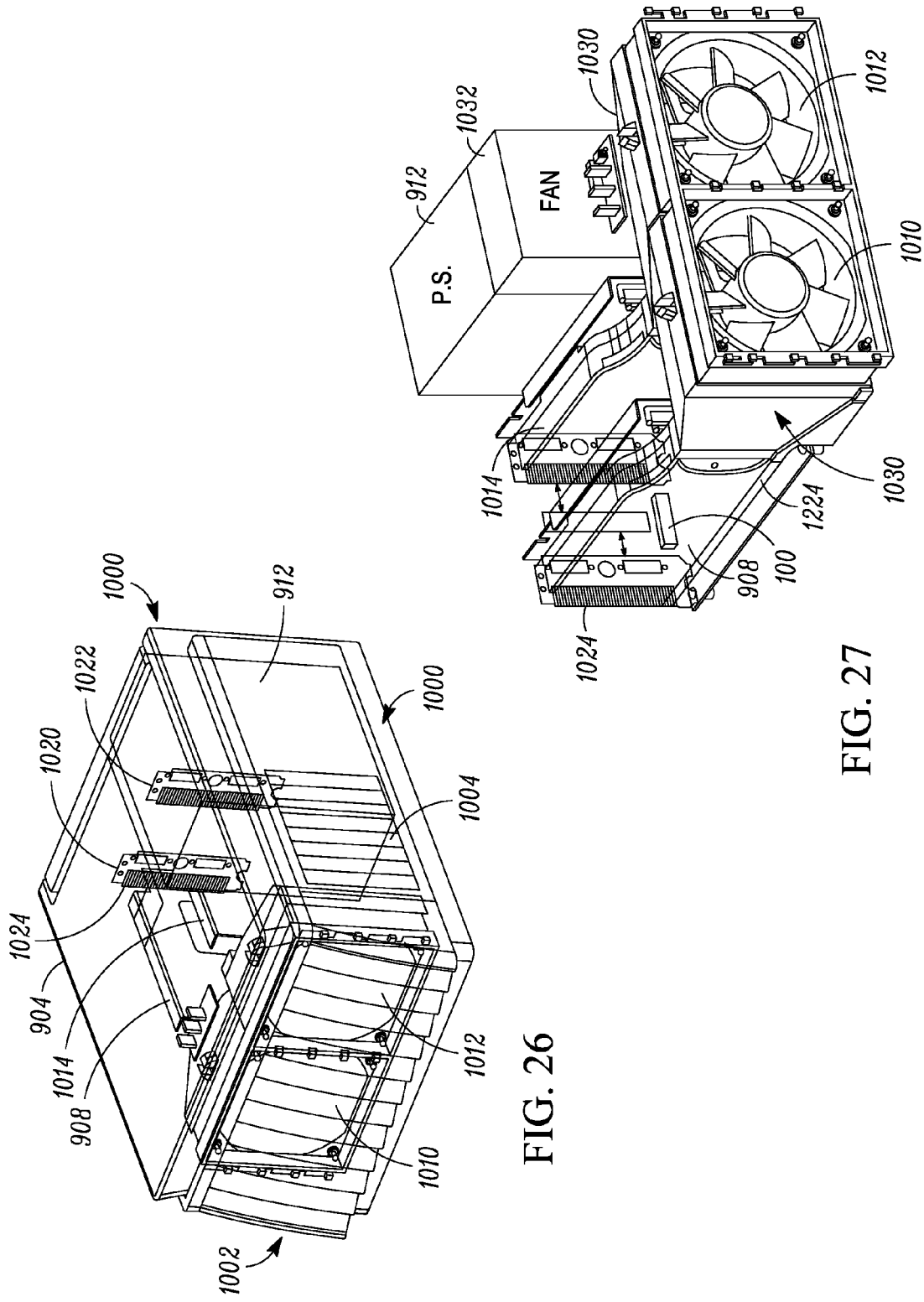

DISPLAY SYSTEM WITH FRAME REUSE USING DIVIDED MULTI-CONNECTOR ELEMENT DIFFERENTIAL BUS CONNECTOR

RELATED CO-PENDING APPLICATIONS

This application is related to co-pending applications entitled "ELECTRICAL CONNECTOR, CABLE AND APPARATUS UTILIZING SAME", filed on even date, Ser. No. 11/955,760, inventor James Hunkins, owned by instant Assignee and is incorporated herein by reference; and "ELECTRONIC DEVICES USING DIVIDED MULTI CONNECTOR ELEMENT DIFFERENTIAL BUS CONNECTOR", filed on even date, Ser. No. 11/955,798, inventors James Hunkins et al, owned by instant Assignee and is incorporated herein by reference.

FIELD OF THE INVENTION

The disclosure relates to electronic devices, that employ connectors that communicate differential signals.

BACKGROUND OF THE INVENTION

Electronic devices such as laptops, desktops, mobile phones and other devices may employ one or more graphics processing circuits such as a graphics processor (e.g. a graphics core co-located on a dye with a host CPU, separate chip coupled to a mother board, or located on a plug-in card, a graphics core integrated with a memory bridge circuit, or any other suitable configuration) to provide graphics data and/or video information, video display data to one or more displays.

One type of communication interface design to provide the necessary high data rates and communication performance for graphics and/or video information between a graphics processor and CPU or any other devices is known as a PCI Express™ interface. This is a communication link that is a serial communications channel made up of sets of two differential wire pairs that provide for example 2.5 MBytes per second (Gen 1) or 5.0 MBytes per second (Gen 2) in each direction. Up to 32 of these "lanes" may be combined in times 2, times 4, times 8, times 16, times 32 configurations, creating a parallel interface of independently controlled serial links. However, any other suitable communication link may also be employed. Due to the ever increasing requirements of multimedia applications that require the generation of graphics information from drawing commands, or a suitable generation of video puts increasing demands on the graphics processing circuitry and system. This can require larger integrated graphics processing circuits which generate additional heat requiring cooling systems such as active cooling systems such as fans and associated ducting, or passive cooling systems in desktops, laptops or other devices. There are limits to the amount of heat that can be dissipated by a given electronic device.

It has been proposed to provide external graphics processing in a separate device from the laptop, desktop or mobile device to allow faster generation of graphics processing through parallel graphics processing operations or to provide output to multiple displays using external graphics devices. However, since devices are becoming smaller and smaller there is an ever increasing need to design connections, including connectors and cabling that allow proper consumer acceptance and suitable speed and cost advantages. Certain video games for example may require high bandwidth graphics processing which may not be available given the cost, integrated circuit size, heat dissipation, and other factors available on a mobile device or non-mobile device.

From an electrical connector standpoint, for years there have been attempts by various industries to design connectors that provide the requisite bandwidths such as the multiple gigabytes necessary to communicate video frame information and/or graphics information between devices. One proposal has been to provide an external cable and circuit board connector that uses for example a 16 lane configuration for PCI-e™. This proposal results in a printed circuit board footprint of approximately 40.3 mm×26.4 mm and a connector housing depth profile 40.3 mm×11.9 mm which includes the shell depth and housing of the connector. However, such large connectors have only been suitable for larger devices such as servers which can take up large spaces and can be many pounds in weight. For the consumer market such large connectors are too large and costly. A long felt need has existed for a suitable connector to accommodate multiple lanes of communication to provide the necessary bandwidth for graphics and video information.

Other connectors such as Display Port™ connectors are limited to only for example two lanes, although they have smaller footprints they cannot support the PCI-e™ express cable specification features and have limited capabilities. Other proposals that allow for, for example a 16 lane PCI-e™ connection have even larger footprints and profiles and may employ for example 138 pin total stacked connector to accommodate 16 lanes (VHDCI). The size of the footprint and profile can be for example in excess of 42 millimeters by 19 millimeters for the footprint and in excess of 42 by 12 millimeters in terms of the PCI-e™ board profile that the connector takes up. Again, such connectors require the size of the mobile device or laptop device to be too large or can take up an unreasonable amount of real estate on the PC board or device housing to accommodate the size of such large connectors. In addition, such connectors also utilize large cabling which can be heavy and cumbersome in use with laptop devices. The costs can also be unreasonably high. In addition, motherboard space is at a premium and as such larger connectors are not practical.

From an electronic device perspective, providing external graphics processing capability in a separate device is also known. For example, docking stations are known that employ a PCI-e™ express interface connector that includes a single lane to communicate with the CPU in for example a laptop computer that is plugged into the docking station. The docking station includes its own A/C connector and has additional display connector ports to allow external displays to be connected directly to the docking station. The laptop which may have for example its own LCD display and internal graphics processing circuitry in the form of an integrated video/graphics processing core or card, utilizes the laptop's CPU to send drawing commands or compressed video via the single lane PCI-e™ express connector to the external graphics processor located in the docking station. However, such configurations can be too slow and typically employ a low end graphics processor since there is only a single lane of communication capability provided.

Other external electronic units that employ graphics processing circuitry to enhance the graphics processing capabilities of a desktop, laptop or other device are also known that employ for example a signal repeater that increases the signal strength of graphics communications across a multilane PCI-e™ connector. However, the connector is a large pin connector with large space in between pins resulting in a connector having approximately 140 pins if 16 lanes are used. The layout requirements on the mother board as well as the size of the connectors are too large. As a result, actual devices typically employ for example a single lane (approximately 18 pin connector) connector including many control pins. As such, although manufacturers may describe wanting to accommodate multilane PCI-e™ express communications, practical applications by the manufacturers typically result in a single lane configuration. This failure to be able to suitably design and manufacture a suitably sized connector has been a long standing problem.

Other external devices allow PCI-e™ graphics cards to be used in notebooks. Again these typically use a single lane PCI-e™ express connector. Such devices may include a display panel that displays information such as a games current frame rate per second, clock speed and cooling fan speed which may be adjusted by for example a function knob or through software as desired. A grill may be provided for example on a rear or side panel so that the graphics card may be visible inside and may also provide ventilation. The internal graphics card may be over-clocked in real time by turning a control knob for example to attempt to increase performance of the external graphics processing capability. However, as noted, the communication link between the CPU and the laptop and the external electronic device with the graphics card typically has a single PCI-e™ express lane limiting the capability of the graphics card.

Also, systems that use multiple graphics processors such as graphics processor cores that are included as part of a Northbridge circuit, CPU, or any other circuit and can generate or render frames based on drawings commands and/or video processing commands. As known in the art drawing commands may be, for example, 3D drawing commands and video processing commands may be commands to decode compressed video or otherwise process video as known in the art. Such systems can generate undesirable amounts of thermal output and consume undesirable amounts of power. A known system attempts to utilize multiple graphics processors to speed up processing to improve performance for a user. For example, a graphics processor (e.g., core with one or more pipelines) is used to provide and generate one frame for display while another graphics processor is used to generate another frame. Multiplexing circuitry is then used to output a rendered frame from a respective frame buffer corresponding to each of the differing graphics processors. However, such rendering is typically done in parallel. In another system, a host graphics processor and its corresponding frame buffer receives a copy of a frame that has been rendered by another graphics processor and stores the copied frame in its local frame buffer. However while the host GPU is using its display engine to display the frame from its local frame buffer that was copied into it by the other graphics processor, it is also using its rendering engine to render portions of another frame in parallel with the remote graphics processor. As such, such systems attempt to provide rendering in parallel thereby increasing the processing capability of the system but also increasing the power usage and thermal output generated.

Also, there is a need to reduce heat produced and power consumed by graphics processors (e.g., cores) in devices such as laptops, handheld devices, desktops and other devices with one or more graphics processors therein.

BRIEF DESCRIPTION OF THE DRAWINGS

The invention will be more readily understood in view of the following description when accompanied by the below figures and wherein like reference numerals represent like elements, wherein:

FIGS. 7-14 are diagrams illustrating signaling provided by the electrical connector of FIG. 1 and cable connector of FIG. 6 in an electronic device or system in accordance with one disclosure set forth;

FIGS. 15-18 are diagrams illustrating signaling provided by the electrical connector of FIG. 1 and cable connector of FIG. 6 in an electronic device or system in accordance with one disclosure set forth;

FIGS. 19-24 are diagrams illustrating signaling provided by the electrical connector of FIG. 1 and cable connector of FIG. 6 in an electronic device or system in accordance with one disclosure set forth;

FIG. 26 illustrates one example of an electronic device that includes at least one electrical connector described herein and a plurality of electronic circuit substrates each containing graphics processors in accordance with one example;

FIG. 27 diagrammatically illustrates an electronic device that employs at least one of the connectors described herein and active cooling mechanism to cool graphics processing circuitry in accordance with one example described herein;

DETAILED DESCRIPTION OF THE PREFERRED EMBODIMENTS

Figure 1:
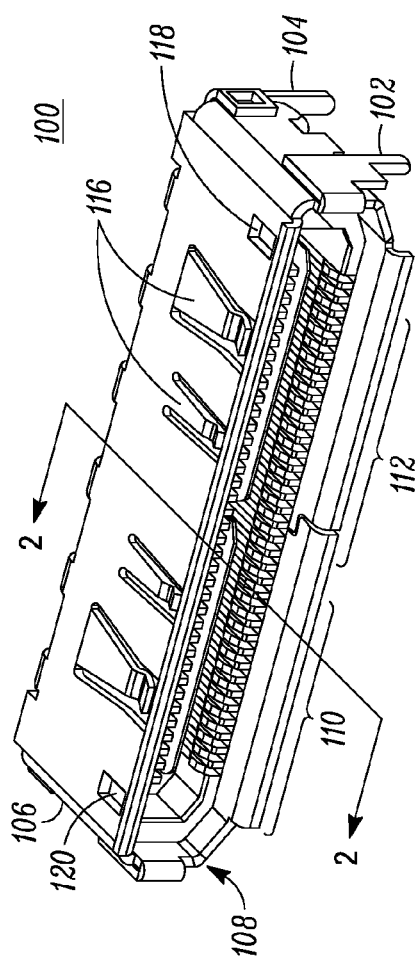
FIG. 1 is a perspective view illustrating one example of an electrical connector in accordance with one example set forth in the disclosure.

Briefly, in one example a method includes reducing power of a first graphics processor by turning off its rendering engine and leaving its display engine capable of outputting display frames from a corresponding first frame buffer to a display. A display frame is rendered by a second graphics processor while the rendering engine of the first graphics processor is turned off or otherwise unused. The rendered frame is stored in a corresponding second frame buffer of the second graphics processor, such as a local frame buffer and copied from the second frame buffer to the first frame buffer. The copied frame in the first frame buffer is then displayed on a display while the rendering engine of the first graphics processor is in the reduced power state. Among other advantages the thermal output and power output is reduced with respect to the first graphics processor since it does not do frame generation using its rendering engine, it only uses its display engine to display frames generated by the second graphics processor. A corresponding apparatus and system is also disclosed.

For example, an electronic device is disclosed that includes a housing that includes an A/C input or DC input, and at least one circuit substrate that includes electronic circuitry, such as graphics processing circuitry (e.g., that performs video/graphics processing as known in the art such as MPEG compression/decompression, 3D graphics rendering based on drawing commands etc.) that receives power based on the A/C input or DC input. The electronic device also includes a divided multi-connector element differential bus connector that is coupled to the electronic circuitry. The divided multi-connector element differential bus connector includes a single housing that connects with the circuit substrate and the connector housing includes therein a divided electronic contact configuration that includes a first group of electrical contacts divided from an adjacent second group of mirrored electrical contacts wherein each group of electrical connects includes a row of at least lower and upper contacts. The device uses it's graphics processing circuitry and a local frame buffer to render an image for a remote device. The rendered image is stored in the local frame buffer and is sent and copied to the remote device's frame buffer via the divided multi-connector element differential bus connector. The remote device's display engine then displays the copied image from its own frame buffer on a display. No rendering need be done by the remote unit so minimal power is consumed by the remote unit.

Drawing commands to render graphics, compressed video for processing or other data for processing is sent from the remote device (e.g., host device) to the electronic device as downstream data via a divided multi-connector element differential bus connector on the remote device. Frames are produced and communicated upstream via the same differential lanes from the electronic device to the remote device via the divided multi-connector element differential bus connectors (and cable) such that, in one example, saturation of the lanes connected to the connector is avoided by sending only the number of frames that make up a maximum remote device display rate. This may done by peer to peer reads triggered directly from the remote device or using any suitable display refresh synchronization schemes known in the art.

Also in one example, the electronic device housing includes air flow passages, such as grills, adapted to provide air flow through the housing. The electronic device housing further includes a passive or active cooling mechanism such as a fan positioned to cool the circuitry during normal operation. In one example, the electronic device does not include a host processor and instead a host processor is in a separate electronic device that communicates with the graphics processing circuitry through the divided multi connector element differential bus connector. In another example, a CPU (or one or more CPUs) is also co-located on the circuit substrate with the circuitry to provide a type of parallel host processing capability with an external device.

In one example, the electronic circuitry communicates with a processor, such as a CPU, in another electronic device external to the housing of the electronic device and the graphics processing circuitry receives drawing commands from the external processor and communicates display data to a display that is coupled to the electronic device. In one example, the housing includes air ducting between the active cooling mechanism and the electronic circuitry. In one example, the divided multi-connector element differential bus connector provides drawing commands to the graphics processing circuitry from, for example, the processor located in the other electronic device. The divided multi connector element differential bus connector may be a unique 16 lane PCI Express™ type bus connector to provide high speed video and/or graphics information between electronic devices.

In one example, the electronic device includes power up control logic, such as a switch, that is operatively coupled to the divided multi connector element differential bus connector that waits to power up the graphics processing circuit until after the external device is powered up as detected from a signal from the divided multi connector element differential bus connector.

In another example, the electronic device includes a plurality of printed circuit boards each including graphics processing circuitry thereon and wherein each of the plurality of printed circuit boards is coupled to the divided multi connector element differential bus connector and wherein the graphics processing circuitry provide parallel or alternate graphics processing operations for a given display frame.

In another example, the circuit substrate includes electronic circuitry and a bus bridge circuit. A backplane is coupled to the bus bridge circuit that includes a plurality of card ports that are each configured to receive a plug-in card.

In another example, an electronic device does not utilize A/C power input but instead gets limited amounts of D/C power from another external device through a suitable connector. In one example, the electronic device includes a housing that includes a circuit substrate that includes a bus bridge circuit and a plurality of divided multi connector element differential bus connectors each coupled to the bus bridge circuit and each including a single connector housing with the divided electrical contact configuration. The bus bridge circuit is coupled to receive power from an external device connected to at least one of the plurality of bus connectors.

In one example, the divided multi-connector element differential bus connector includes a housing having therein a divided multi-connector element. The electrical connector is adapted to electrically connect with a substrate, such as a circuit board. The divided multi-connector element includes a divided electrical contact configuration that includes a first group or subassembly of electrical contacts physically separate from an adjacent and second group or subassembly of contacts. The first group of electrical contacts and second group of electrical contacts each include a row of lower contacts and upper contacts. The second group of electrical contacts has an identical but mirrored configuration (e.g., with respect to a vertical axis) as the first group of electrical contacts.

In one example, the electrical connector housing is sized to provide a substrate footprint of approximately 12 mm×53 mm and has a profile of approximately 53 mm×6 mm and includes 124 pins configured for a 16 lane differential bus. The 16 lanes are divided into two 8 lane pin groupings. Also in one example, the first and second group of contacts include an end grounding contact wherein a respective end grounding contact is positioned adjacent to another end grounding contact in the other group and are located substantially in the center of the connector housing. Also in one example, rows of upper contacts are surface mount pins and rows of lower contacts are through hole pins that pass through the substrate.

An electrical device is also disclosed that employs the above mentioned electrical connector and has an electronic circuit substrate coupled to the electrical connector and also includes electronic circuitry located on the electronic circuit substrate that is coupled to the first and second group of electrical contacts. The electronic circuitry provides a plurality of differential data pair signals on either side of a center portion of the connector and also provides differential clock signals in a center portion of the first group of electrical contacts. The first row of upper contacts are used to provide control signals associated with the differential pair signals.

The second group of contacts are coupled such that the second row of lower contacts includes a plurality of differential data signals that are provided on adjacent pins separated by differential ground. A cable is also disclosed that has same end connectors that mate with the electrical connectors. In one example, the cable assembly has a 16 lane connector on one end and an 8 lane connector on the other, adapted to electrically mate with only the first group of electrical contacts in the 16 lane connector and not the second group of electrical contacts thereby allowing a 16 lane board connector to be used to connect to an 8 lane unit.

One of the many advantages of the disclosed connector or cable or electronic device include the providing of a compact connector that provides high speed communication via a multilane differential signaling bus, such as a PCI Express™ compatible bus or interface. Additionally, an 8 lane connector may also be suitably connected with a 16 pin board connector via an 8 lane cabling system since a group of contacts and electronic circuitry provides the necessary data clock signal through a single grouping of contacts.

Figure 2:
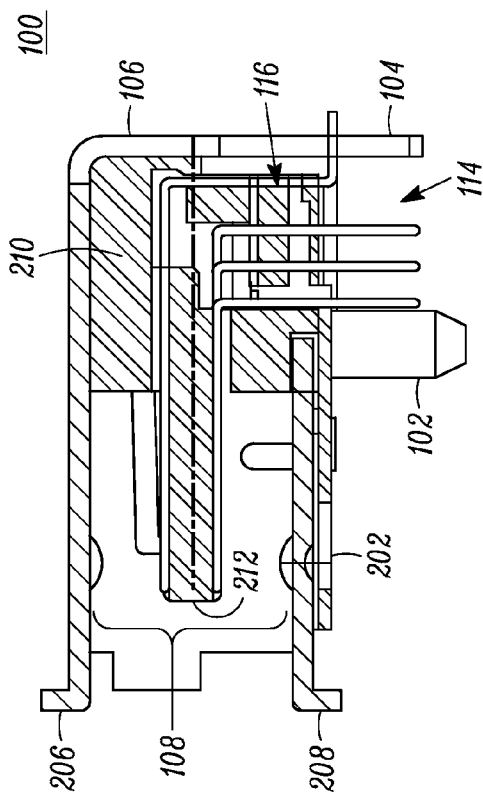
FIG. 2 is a cross sectional view of the connector of FIG. 1.

Referring to FIGS. 1 and 2, one example of an electrical connector 100 that may be coupled to a circuit substrate, such as a printed circuit board, includes a substrate positioning or locating pin 102 and a shell or housing connection post 104. The positioning pin 102 and housing connection post 104 are configured to pass through holes that have been drilled in the circuit substrate and facilitate the mounting of the electrical connector to the substrate. The electrical connector 100 includes a housing 106 that includes a divided multi-connector element 108 that is adapted to electrically connect with a circuit substrate, via for example separate subassemblies of contact pins. The divided multi-connector element 108 includes a divided electrical contact pin configuration that includes a first group or subassembly of electrical contacts 110 that are physically separate or disconnected from an adjacent and second group or subassembly of contacts 112.

Figure 3:
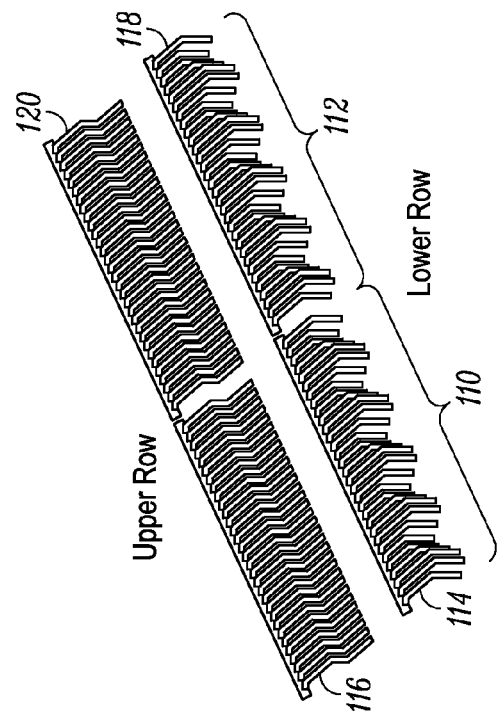
FIG. 3 illustrates one example of upper and lower rows of contacts used in the connector of FIG. 1.

Referring also to FIG. 3, the first group of electrical contacts 110 includes a row of lower contacts 114 and a row of upper contacts 116. Similarly, the second and separate group of electrical contacts 112 includes an identical but mirrored configuration as the first group of electrical contacts and as such, has identical and mirrored but separate corresponding rows of lower contacts 118 and upper row of contacts 120. In this example, the first group of electrical contacts 110 form a complete 8 lane PCI Express™ communication interface when coupled to a PCI Express™ transceiver circuit, such transceiver circuits are known in the art. The rows of lower contacts 114 and 118 separate subassemblies and are through hole pins in this example. They are coupled in an electronic device to include and provide connection with differential receivers or transceivers (see for example, FIGS. 7-14). The groups of top rows of contact pins 116 and 120 are surface mount pins which mount to a surface of the circuit substrate, and are coupled to an electronic circuit to provide differential transmission signals. In this example, a 16 lane PCI Express™ compatible connection can be facilitated in a small profile and relatively inexpensive connector design. Each separate groupings of contacts are electronically connected to each provide 8 lanes of differential signaling based communication resulting in the 16 lane communication bus.

Referring back to FIG. 1, the housing 106 may be made of any suitable material including insulating plastic or any suitable composite material as known in the art. The electrical contacts may also be made of any suitable material such as copper alloys with suitable plating such as gold plating over nickel or any other suitable material and finish as desired. The lower row of contacts 114 in the first group are fabricated as a separate set of lower row of pins and serves as a subassembly of the connector 100. Lower row of contacts 118 are an identical and mirrored subassembly and separate from the lower row of contacts 114. Similarly, the upper row of contacts 116 and 120 are configured as separate assemblies each identical and mirrored to one another. In this example, a total of four sets of pins are used to provide the two groupings of upper and lower contacts. Among other advantages, the separation of the lower and upper contacts into separate subassemblies can help reduce the number of pins required to provide the signaling required for a 16 lane or 8 lane PCI Express™ type bus. Other advantages will be recognized by those of ordinary skill in the art.

Figure 4:
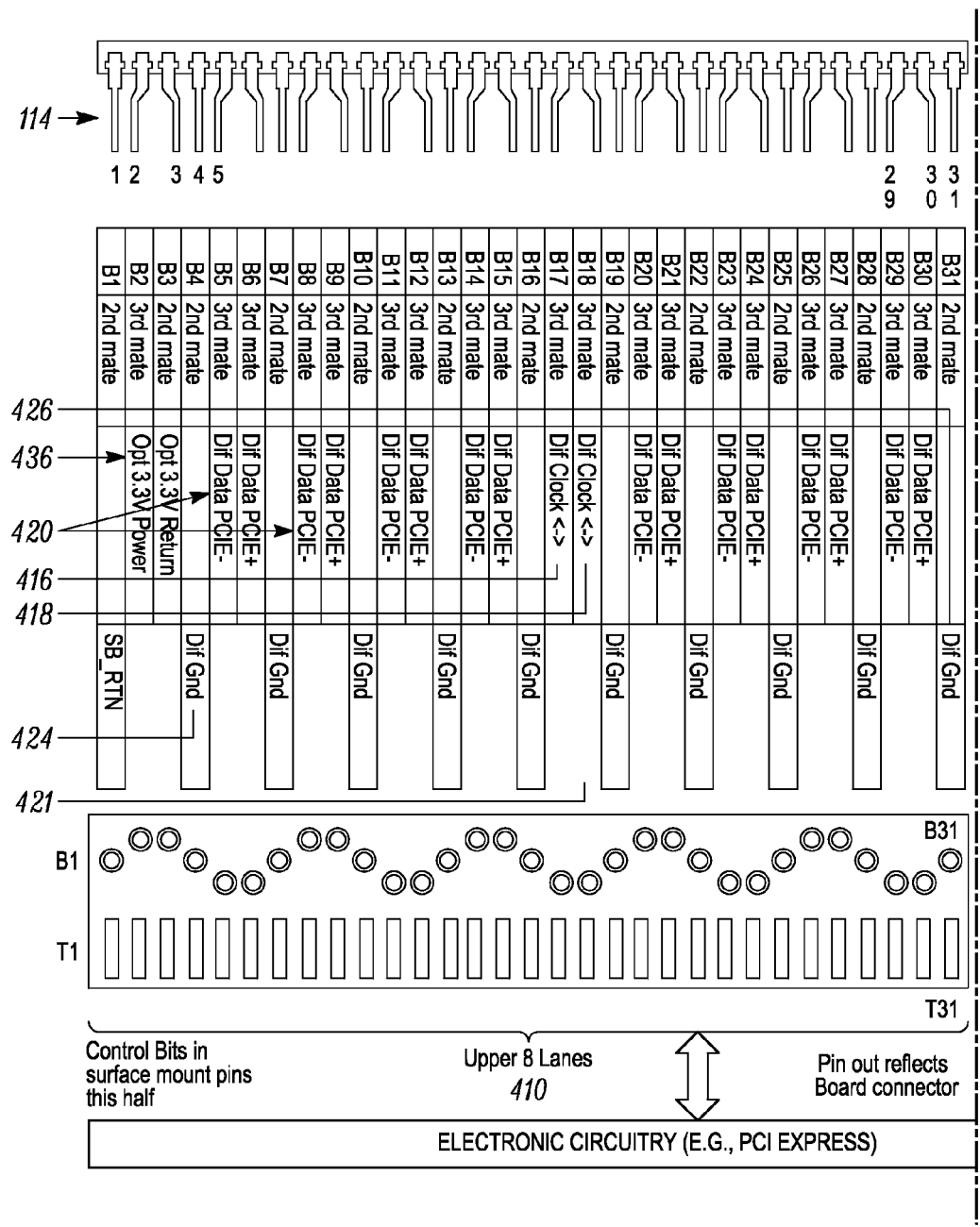
FIGS. 4 and 5 diagrammatically illustrate signaling configurations provided by the connector of FIG. 1 according to one example set forth in the disclosure.
Figure 5:
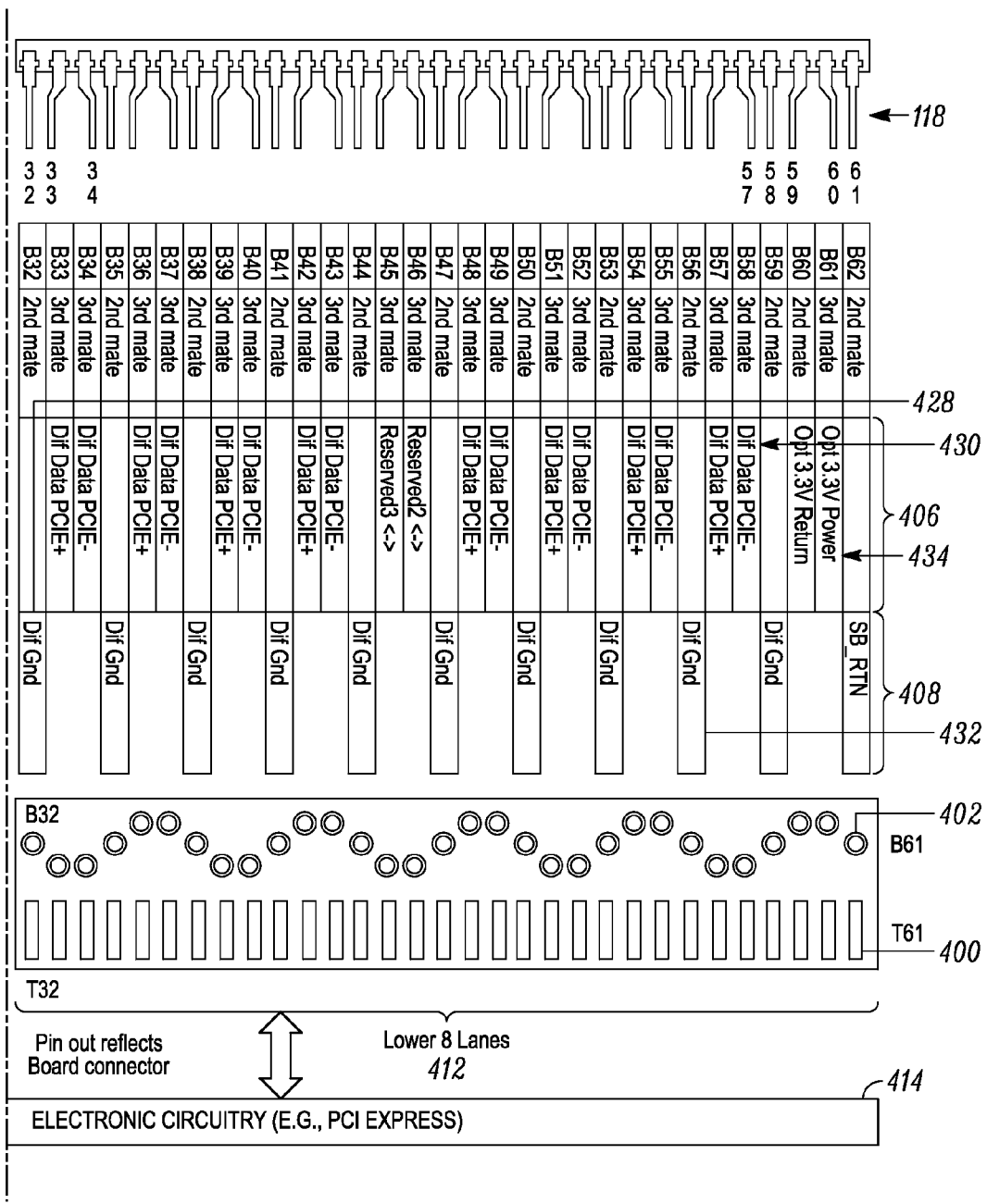

Also as shown in this example, the spacing between the surface mount pins may be, for example, 0.7 mm and the width of a surface mount pin may be, for example, 0.26 mm however any suitable spacing and width may be used. The through hole pins may have a spacing of, for example, 0.7 mm (and as shown in FIGS. 4 and 5), may be offset. In addition, the width of the through hole pins may be, for example, 0.74 mm. However, any suitable sizing may be employed as desired.

With the 16 lane PCI Express™ compatible configuration, the housing 106 is sized to provide a substrate footprint of approximately 12 mm×53 mm such that the housing may have, for example, a 12.2 mm depth and a 53.25 mm width, or any other suitably sized dimensions. For example, the depth and width may be several millimeters larger or smaller as desired. Also in this example, the rows of lower and upper contacts for both the first and second group of electrical contacts include 124 pins configured for a 16 lane PCI Express™ interface (e.g., two 8 lane differential bus links).

The connector 100 as shown may include one or more friction tabs 116 that frictionally engage a cable connector that mates with the board connector 100. Other known connector engagement features may also be employed such as openings 118 and 120 that receive protrusions that extend from a corresponding mating cable connector.

Referring again to FIG. 2, the connector 100 may include as part of the housing, insulation covering 202 and ground contacts and frictional locks 206 and 208 that frictionally engage with a mating cable connector using techniques known in the art. Supporting structures 210 are also employed to support pins in their appropriate positions within the connector using known techniques. The connector 100 includes a center support structure 212 over which the upper rows of surface mount pins 116 are supported and over which lower contacts 114 are also supported. The center support structure 212 supports the electrical contacts and in operation receives a mating connector whose contacts align with the upper and lower contacts 114 and 116 to make electrical contact.

FIGS. 4 and 5 diagrammatically illustrate a portion of a printed circuit substrate referred to as a substrate layout showing surface mount contacts 400 and through holes 402 that are positioned on a circuit substrate. The lower rows of contacts 114 and 118 are coupled to the through holes 402 to provide electrical contact and signal communication through the connector 100 to an electrical circuit or circuits on the printed circuit board. Traces or pins from an electrical circuit may be electrically coupled to the pads 400 to communication signals through the connector 100. The figure shows a pinout of the bottom row contacts of connector 100 and the electronic signals designated as 406 and 408 corresponding to respective contacts in the connector 100.

In this example, groupings of contacts form upper 8 lanes shown as 410 and a lower 8 lanes designated 412. Electronic circuitry 414, such as a PCI Express™ 16 lane interface circuit that may be integrated in a graphics processor core, CPU, bridge circuit such as a Northbridge, Southbridge, or any other suitable bridge circuit or any other suitable electronic circuit sends and receives signals identified as 406 and 408 via the connector 100. Electronic circuitry 14 is located on the electronic circuit substrate and is coupled to the first group of electrical contacts and second group of electrical contacts (shown here are only the lower contacts). The electronic circuitry 414 provides differential clock signals labeled 416 and 418 that are located in a center portion of the first group of contacts 110. The electronic circuitry also provides a plurality of differential data pair signals generally designated as 420 on either side of a center portion 421. Corresponding differential ground signals 424 are provided between the differential signals 420. Upper contacts 116 (not shown) provide control signals associated with the differential data pair signals 420. In this example, the other group of contacts 112 does not include the differential clock signals 416 and 418. The electronic circuitry provides all of the necessary PCI Express™ type control signaling, clock signaling and power to run an 8 lane bus via the first grouping of contacts 110. 16 lanes may be accommodated by providing the signaling as shown. This incorporates utilizing the second group of contacts 112.

As also shown, the first group of electrical contacts 110 and second group of electrical contacts 112 are divided by adjacent ground contacts designated 426 and 428. The second group of contacts 112 are coupled such that the second row of lower contacts include a plurality of differential data signals 430 that are provided on adjacent pins separated by corresponding differential ground signals 432 and power is provided on an outer pin portion designated as 434 to a second row of lower contacts. Similarly, power is provided on an outer portion of the connector corresponding to the first group of contacts 114 shown as power signals 436. In this example, the electronic circuitry 414 includes differential multilane bus transceivers that are PCI Express™ compliant, as known in the art. However, any suitable circuitry may be coupled to the connector 100 as desired. As also shown, the first and second group of contacts 110 and 112 each include the end grounding contact 426 and 428 that are positioned adjacent to each other and substantially in the center of the housing.

In addition, the first and second groups of electrical contacts include sensing contacts positioned at an outer end of a row of contacts to determine proper connector insertion on both ends of the cable. In addition, the connector also includes a power control pin that can be used in conjunction with the sensing contacts to control power sequencing and other functions between the two connected systems.

Figure 6:
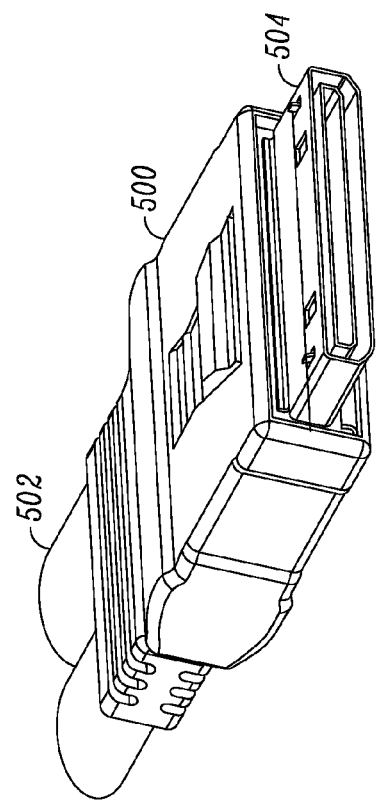
FIG. 6 is a perspective view illustrating one example of a cable connector that mates with the connector of FIG. 1 in accordance with one example set forth in the disclosure.

FIG. 6 illustrates one example of a cable having a cable end connector 500 that is configured to matingly engage with the connector 100. The cable 502 includes an end connector on either end thereof (although not shown) that are identical to the end connector 500 and the connector end 500 is adapted to mate with the divided multi-connector element 108. As such, the cable end connector 500 also includes a male portion 504 that engages with the contacts via center portion 212 of connector 100. As known in the art, the end connector may be made of any suitable materials including plastic and metal to provide the necessary structural, shielding and grounding characteristics as desired. The male portion 504 is adapted to frictionally engage with the friction tabs 116 of the board connector 100. The cable 502 may be made of two groups of wires each forming an 8 lane grouping. However, any suitable configuration may be used.

FIGS. 7-14 illustrate a diagram illustrating electrical signals that are provided by the electrical circuitry 414 through connector 100 in one device and corresponding electrical circuitry that is in another device that is connected via the cable connector 502. As such, a host device (referred to as host side), such as a laptop computer or any other suitable device is connected via a cable to a downstream device via a connector 100 and the downstream device also contains the connector 100. As such, a simplified connector/cable pairing is suitably provided with high speed data communication capability. As illustrated, the connector 100 is operatively coupled to electronic circuitry to provide the signals on the pins as shown. As a point of reference, a portion of FIGS. 4 and 5 showing the signals is duplicated in FIGS. 7-14 shown by arrow 600. The top row of contacts 116 and 120 are shown by the portion labeled 602. As shown, the bottom rows of contacts 114 and 118 are primarily coupled between differential transmitters of for example a graphics processor (downstream device) and differential receivers of the host device whereas the top rows 116 and 120 of connector 100 are coupled between receivers of the graphics processor located in a downstream device and differential transmitters of a host device.

In the host device, the corresponding lower rows 114 and 118 shown as 604 are provided as shown. For example, a top row 116 and 120 on a host side device shown as signals 606 are provided by suitable electronic circuitry. In this example, the circuitry as noted above includes PCI Express™ compliant interface circuitry that provides in this example 16 lanes of information. The total number of pins used in this example is 124 pins. As such, this reflects a signal and pinout for a 16 lane to 16 lane connection.

FIGS. 15-18 illustrate instead, a signal and pinout configuration for an 8 lane to 8 lane connection using instead of a 16 lane sized connector, an 8 lane size connector. However, the identical signals are provided on the identical pins of the 8 pin connector as are provided on the first group of connectors 110 of the 16 lane connector. As such, an 8 lane connector may be employed that is similar in design to the connector shown in 100 except that half of the pins are used resulting in a housing that is sized to provide a footprint of approximately 12 mm×32 mm and a profile of approximately 32 mm×6 mm and includes a total of 68 pins configured in a row of lower contacts and upper contacts. As such, FIGS. 9 and 10 illustrate a host side connector 702 that is connected with a downstream device connector 704 via an 8 lane cable 706.

FIGS. 19-24 illustrate yet another configuration that employs pinout and signaling wherein a first device such as a host device employs an 8 lane connector with signaling shown as 702 with a cable that at another end includes the connector 100 with the pinout and signaling shown as 600 and 602. As such, an 8-16 lane connector configuration may be used wherein only 8 lanes of the 16 lane connector are actually coupled to circuitry. In this manner, existing 16 lane connectors may be readily coupled to devices that employ 8 lane connectors if desired.

Figure 25:
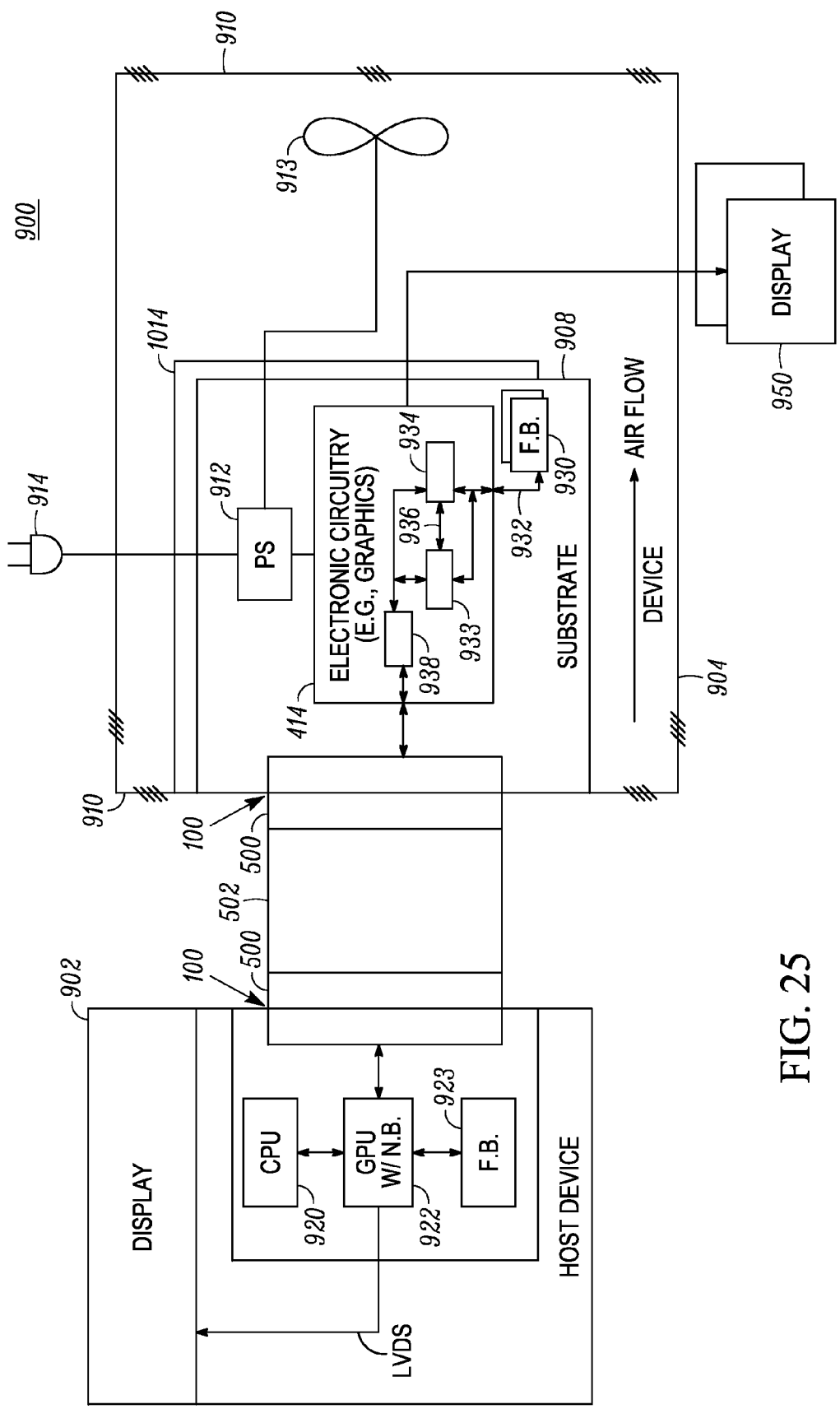
FIG. 25 diagrammatically illustrates a system employing frame reuse in accordance with one example set forth in the disclosure.

FIG. 25 illustrates one example of a system 900 that employs a first device 902, such as a host device such as a laptop, desktop computer or any other suitable device and a second device 904 such as a device employing an electronic circuit that includes electronic circuitry 414 operatively mounted to substrate 908 such as a printed circuit board that contains connector 100. The electronic circuitry 414 may be, for example, a graphics processor or any other suitable circuitry and in this example includes PCI Express™ compliant transceiver circuitry to communicate with the host device 902 via the cable and connector structure described herein. The device 904 which may include, for example, a housing that includes grates that serve as air passages 910 that provide air flow for cooling the electronic circuitry and may also include an active cooling mechanism such as a fan 913 although suitably controlled to provide cooling via air flow, as known in the art. The substrate 908 may include a power supply circuit 912 that provides a suitable power for all electronic circuitry and may receive alternating current (AC) from an outlet through plug 914. The host device may include as known, one or more central processing units 920 and one or more graphics processors 922 in addition to suitable frame buffer memory 923, operating system software and any other suitable components, software, firmware as known in the art. As such, in this example, the device 904 may receive drawing commands from the CPU 920 and/or GPU 922 via the differential signaling provided through the connectors 100 and cabling 502 to provide off device graphic processing enhancement through a suitable connector arrangement that is consumer friendly, relatively low cost and provides the data rates required for a high data rate video, audio and graphics processing.

The electronic circuitry 414 as noted above may include graphics processing circuitry such as graphics processor core or cores, one or more CPUs, or any other suitable circuitry as desired. As shown, in the case that the electronic circuitry includes graphics processing circuitry, one or more local frame buffers 930 are accessible by the graphics processing circuitry through one or more suitable buses 932 as known in the art. Also, in another embodiment, where a single circuit substrate 908 is used, the electronic circuitry 414 may include a plurality of graphics processing circuits such as a plurality of graphics processors 933 and 934 that are operatively coupled via a suitable bus 936 and may be connected with the divided multi-connector element differential bus connector 100 via a bus bridge circuit 938 such as a PCI bridge, or any other suitable bus bridge circuit. The bus bridge circuit provides information to and from the connector 100 and also switches communication paths between the connector 100 and each of the graphics processors 932 and 936 as known in the art. As such, in this example, a plurality of graphics processors, for example, can provide parallel or alternate graphics processing operations for the host device 902 or other suitable device.

FIG. 26 diagrammatically illustrates one example of the device 904 in a housing 1000 that includes air flow passages shown as 1002, 1004 and 1006. In this example, the air flow passages are grills that provide air flow through the housing. The active air cooling mechanism 912 is shown as being a plurality of individual fans 1010 and 1012 that provide cooling for a plurality of printed circuit boards 908 and 1014 (e.g., cards) that may contain, for example, graphics processors, multimedia processors, CPUs, or any suitable electronic circuitry. Also referring to FIG. 28, in this example, each of the cards 908 and 1014 are connected by either separate standard PCI-E connectors 1220 and 1222 (or a board to board version of the divided multi-connector element differential bus connectors 400) on a backplane card 1224 which holds a PCI-E bridge which connectors the two cards to a separate divided multi connector element differential bus connector 100 (see for example, FIGS. 4 and 5).

Graphics card brackets 1020 and 1022 hold connectors for external monitors. In this example, no CPU is employed in the device 904 and in this example the device is used as a type of external graphics enhancement device. Also in this example, ducting such as plastic passages designated as 1030 direct air flow over the elements to be cooled on the printed circuit boards or cards 908 and 1014. In addition, the power supply may also include a separate fan designated 1032. However, it will be recognized that any single fan for all cooling operations or multiple fans may be used as desired.

Figure 28:
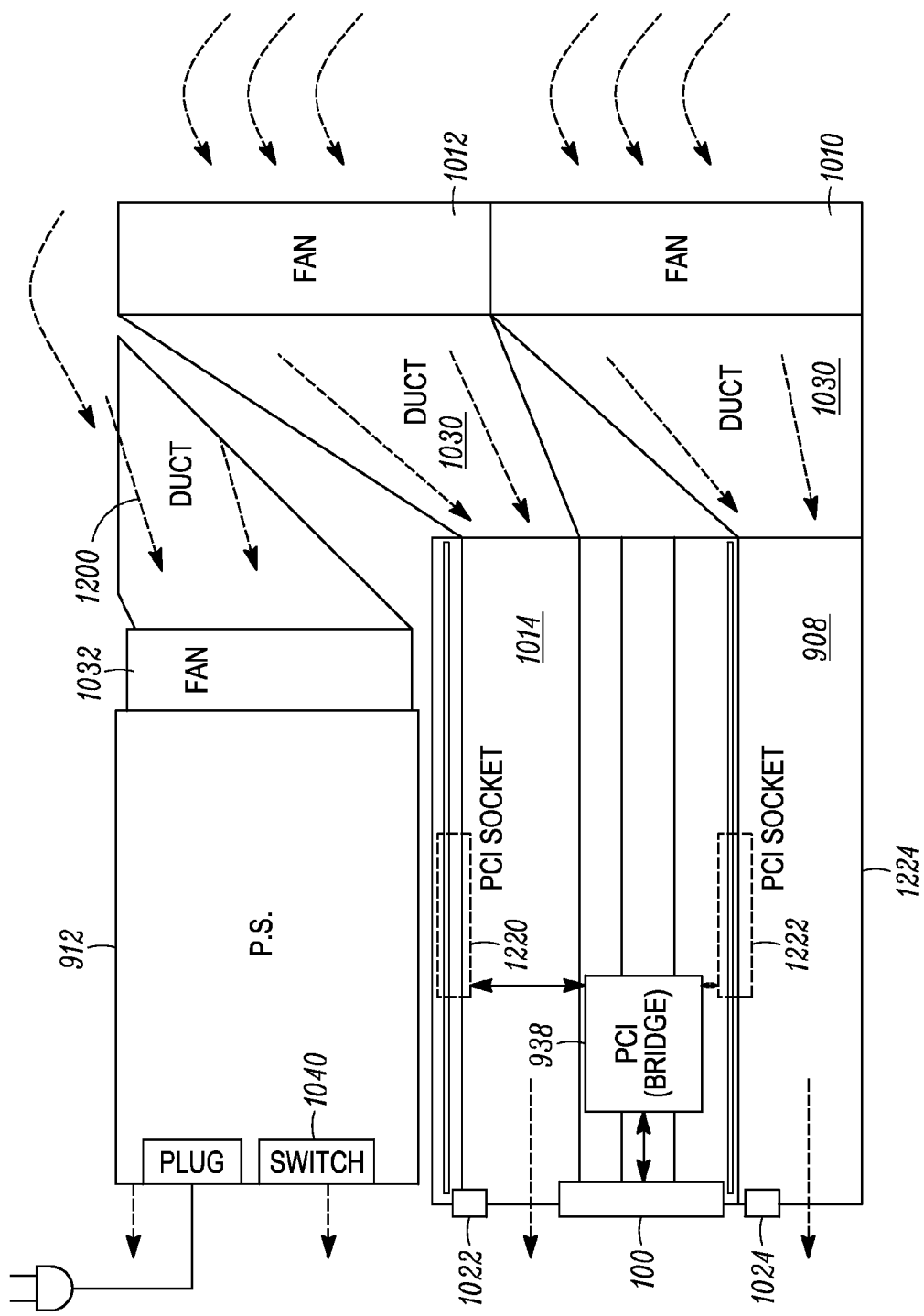
FIG. 28 diagrammatically illustrates the device of FIGS. 26 and 27.

Referring to FIGS. 27 and 28, there may also be ducting to direct air flow from a grill to a fan as shown by ducting 1200. As also shown, the cards 908 and 1014 are separated to provide thermal convection as desired. Also shown as part of the power supply is an on/off switch 1040. The power supply may receive an A/C input such as an A/C signal from an outlet and convert the A/C to DC or may receive a DC input signal from a DC power source. In this example, the cards 908 and 1014 have in this example, PCI edge connectors at a bottom thereof 1220 and 1222 (see FIG. 28) that connect with a backplane 1224 that, in this example, lies horizontally beneath the cards 908 and 1014. The backplane includes connectors that mate with the card edge connector. The bus bridge circuit 938 acts as a switch to route information from the connector 100 to either or both of the cards 908 and 1014.

It will be recognized that many usage scenarios are possible. For example, a circuit board with one or more graphics processors for example may be utilized to upgrade a remote host system, that may also have one or more graphics processors therein depending upon performance requirements. Each graphics processor may be individually coupled to a connector 100 or each graphics processor may use, for example, 8 lanes of a single connector as desired or share all 16 lanes through a PCI-E switch device. In addition, portable devices such as laptops may enhance their graphics processing or video processing capability or other processing capabilities, if desired, since thermal limits and power limits are reduced due to the separate electronic device. As such, as used herein, graphics processing circuitry can include video processing such as video coding and decoding circuits, high definition television image processing, or any other suitable video processing or multimedia processing operations as desired. It will be appreciated that external devices that may connect to the electronic device 904 for example may include set top boxes, televisions, game consoles, handheld devices, laptops, desktops, or any other suitable device as desired. In addition, one or more displays such as LCD displays may also be connected to the device 904. Display ports may be utilized so that separate displays may be plugged into the electronic device 904 so that the output from the graphics processors therein can be displayed on one or more display (see FIG. 25). Alternatively, the graphics processor within the device 904 may send frame information or any other information back to the host device which may then use its own display capabilities to output the information on a different display.

Referring also to FIGS. 7-14, the CPWRON signal comes from the host device across the connector 100 indicating when, for example, the external device is powered up and active (a non-standby mode). The electronic circuitry in the device 904 then detects a CPWRON signal and powers up. The CPRSNT pins are used to detect full connection of the device 904 to an external device such as a host system to both help gate the power on of the device 904 and to notify the host system that the external device 904 is connected and powered. Two pins are used in one example to ensure that the connector 100 is fully seated before notifying the host system that it is available. In addition, a hot plug mechanism may also be utilized to detect when the device 904 is connected to another external device.

Figure 29:
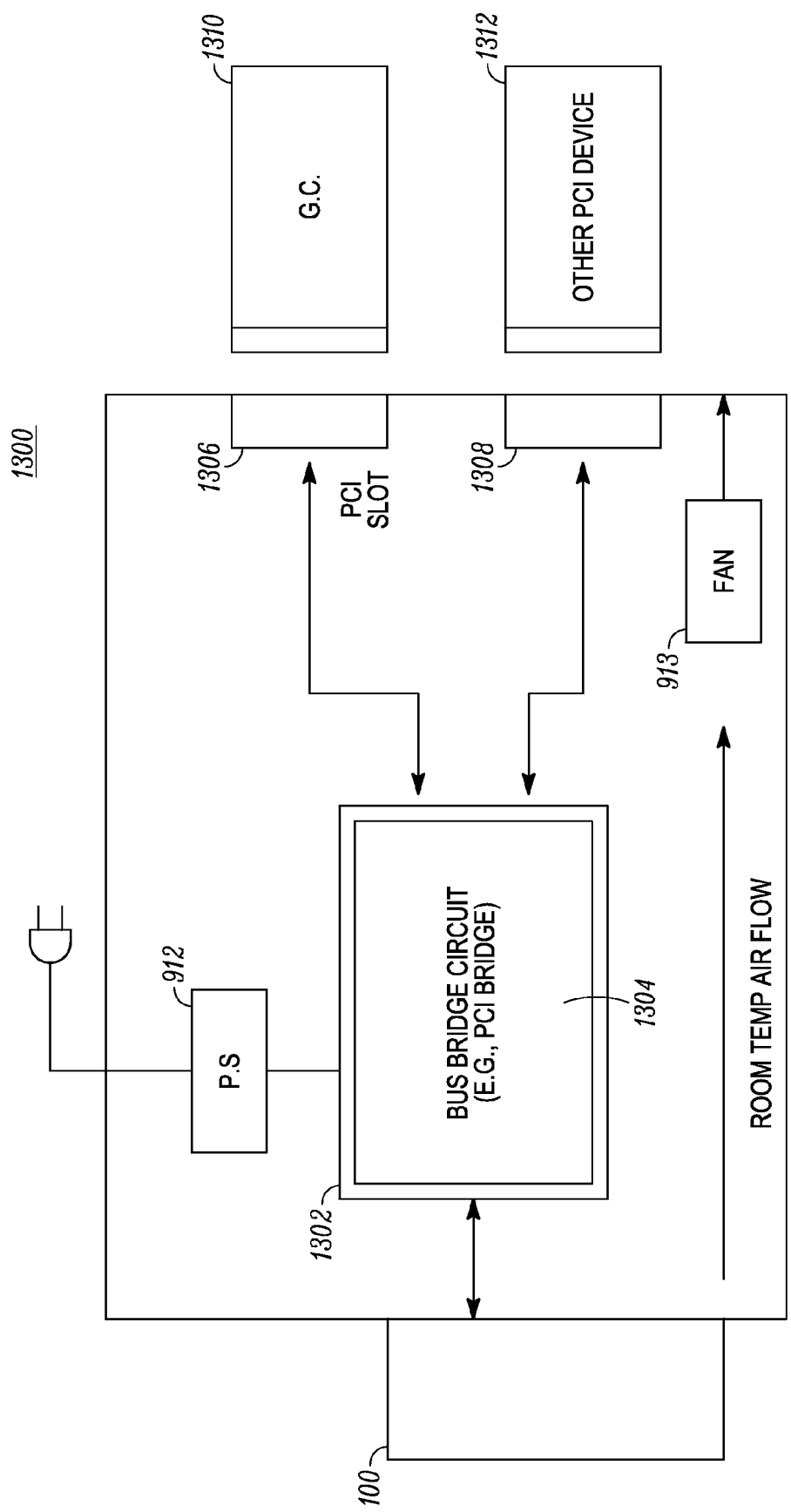
FIG. 29 is a block diagram illustrating one example of an electronic device that facilitates card plug-in of a plurality of plug-in cards in accordance with one embodiment described herein.

FIG. 29 illustrates another example of an electronic device 1300 that includes a circuit substrate 1302 that includes a bus bridge circuit 1304 that is coupled to the connector 100 and is coupled to bus slot ports 1306 and 1308. The bus slot ports 1306 and 1308 need not be connector 100 but may be, for example, PCI Express™ slots that receive PCI Express™ cards 1310 and 1312 that may include any suitable electronic circuitry thereon. The bus slot ports 1306 and 1308 may be mounted on an active backplane for example. The active backplane may be an active backplane card to facilitate easy connection with the bus bridge circuit 1304. The active backplane card includes the plurality of card ports 1306 and 1308 that are configured to receive a plug-in card 1310 and 1312. The bus bridge circuit 1304 may be, for example, a Northbridge, Southbridge or other suitable bridge circuit that includes for example, the transceivers necessary to communicate via a PCI Express™ communication link, or any other suitable link. In this example, there is no graphics processing circuitry necessary since the graphics processor may be on one of the plug-in cards 1310 or 1312. This can result in a smaller electronic device 1300 which still facilitates high speed video communication through the connector 100. As such, standard PCI Express™ cards may be plugged into the slots 1306 and 1308 but a unique connector such as connector 100 is utilized to connect with another electronic device such as a device with a host CPU, for example.

Figure 30:
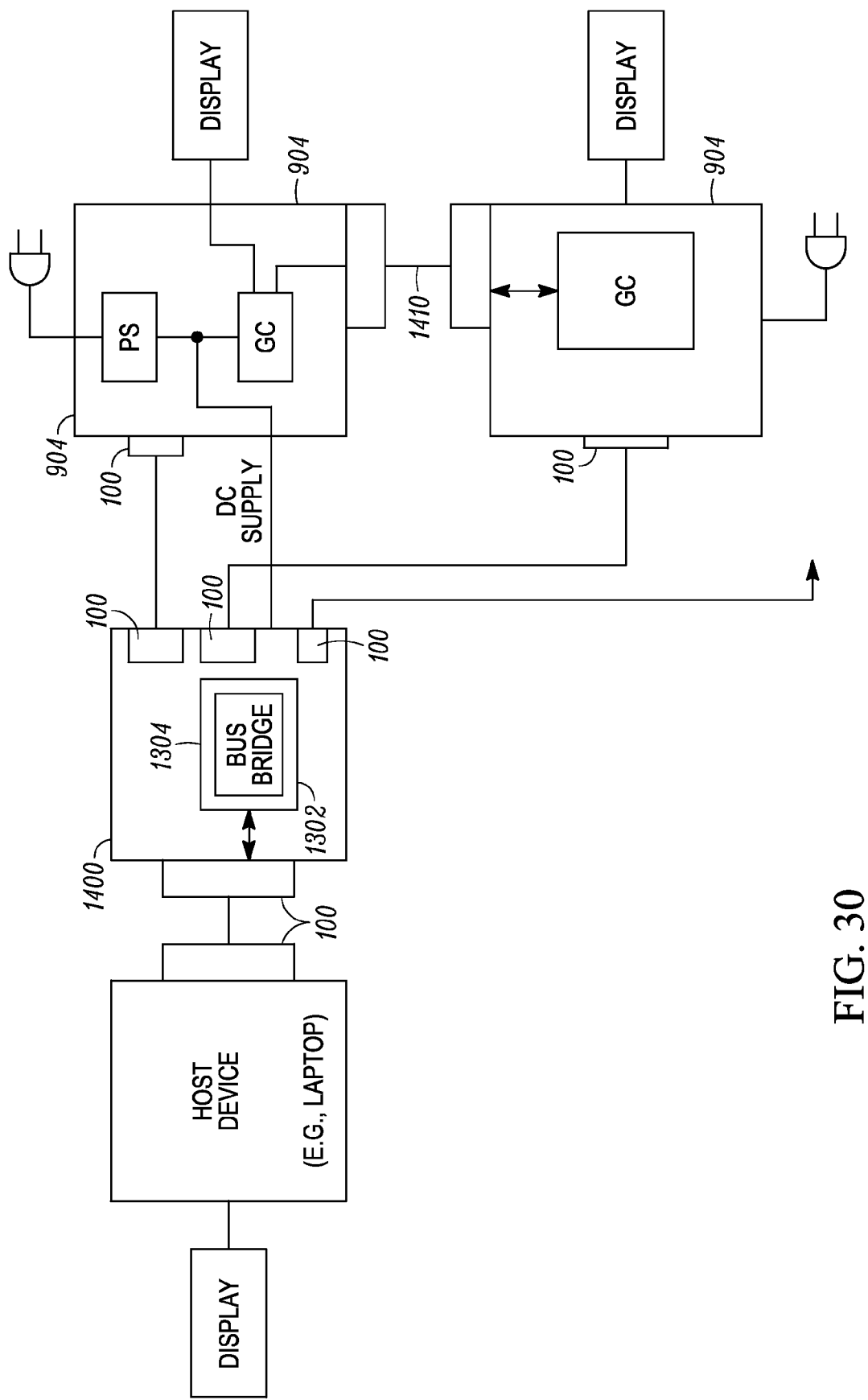
FIG. 30 illustrates a block diagram of a system that employs a hub device in accordance with one example described herein.

FIG. 30 illustrates another electronic device 1400 that instead of utilizing standard bus slot connectors 1306 and 1308, utilizes connectors 100 so that additional electronic devices such as that shown in FIG. 25 (device 904) may be suitably connected to the hub device 1400. Also in this example, there is no need for A/C connector since the power for the PCI bridge circuit 1304 would be provided by a downstream device through a power connection in parallel to the connector 100. As also shown, a non-differential bus 1410 may also be employed between the electronic devices 1904 if desired to provide a direct communication link between the devices as opposed to going through the bus bridge circuit 1304. With the multiple graphics processors in the electronic devices 1904, parallel graphics processing or video processing may be employed if desired.

The device 1400 serves as an electronic hub device. It includes a plurality of divided multi connector element differential bus connectors 100 that are coupled to the bridge circuit 1304. Each of the other electronic devices 1904 include an A/C input but also include divided multi connector element differential bus connectors 100. Displays may also be coupled so that output from the electronic circuitry may be provided to corresponding displays. The bus connection 1410 between the graphics processing circuitry of each external electronic device is different than the bus through the divided multi connector element differential bus connector. The displays display frames generated by the graphics processing circuitry from one or both of the electronic devices 1904.

Referring again to FIG. 25, the electronic device 904 includes the local frame buffer 930 that is coupled to the graphics processing circuitry 414. The graphics processing circuitry 414 (e.g., one or more graphics processors 933 or 934) generates and stores display frames in the local frame buffer 930 for the host device which is external to the housing of device 904, in response to data received from the host device via the divided multi-connector element differential bus connector 100. The electronic circuitry 414 is operative to communicate the display frames from the frame buffer 930 to the other device 902 through the divided multi-connector element differential bus connector 100. The data received from the other device may include, for example, drawing commands sent by CPU 920 communicated via the multilane cable and connector system 100, 500, 502. Other data may include, for example, video data such as compressed image information such as MPEG, JPEG, or other video compressed information which is then suitably decompressed and processed by the electronic circuitry 414 to generate display frames that are stored in the frame buffer 930 and subsequently sent upstream to be stored in the frame buffer 923 of the host device so that it is copied therein and then displayed by a display engine, such as a portion of the graphics processor 922 as known in the art and displayed on the display of the host device via, for example, the LVDS bus, or in any other suitable fashion.

As such, the graphics processing circuitry 933 or 934 is operative to communicate with the processor 920 (and/or 922) in the host device and the graphics processing circuitry 933 or 934 may receive drawing commands or other data from the processor 920 and communicate generated frames of the display data to the host device for display by the host device. In this example, the graphics processing circuitry 414 or 933 and 934 uses the plurality of differential signaling lanes of the differential links provided via the divided multi-connector element differential bus connectors 100. As such, the electronic circuitry 414 may generate frames for display on display 950 or may provide copies of display frames from its local frame buffer 930 to be displayed by the host device on a display coupled to the host device. As such, independent units such as unit 904 with its own AC power source can render an image into its local frame buffer and send the completed image to a host frame buffer via the multilane PCI Express link via the unique connectors 100. The host's display engine displays the copied image from its frame buffer to a display device. No rendering (e.g., generation of a frame based on drawing commands and/or video information) needs to be done in the host device so minimal power is consumed in the host device. In addition, reuse of the PCI Express lanes in an upstream direction is provided to provide peer to peer transfer of each frame from the unit 904 to the host unit. In operation, the graphics processing circuit 933 or 934 (or both) send only the number of frames needed by the host device at a maximum rate compliant with the host display refresh rate of the displays that are being connected to the host. This may be, for example, sixty frames per second for laptops if the host device is a laptop. Frame rate regulation may be carried out in an number of ways in order to avoid saturation of the PCI Express bus by sending more display frame information than can be displayed by the host. Synchronizing of the frame data is desirable to match the display rate of the laptop or host device. Different synchronization mechanisms may be used such as peer-to-peer writes from the unit 904 to the host with handshaking between the two units as necessary to indicate when the host is ready for the next frame of data or by peer-to-peer reads from the unit 904 initiated directly by the host when the host needs a new frame of display data, independent of additional handshaking between the units and therefore enhancing response time As such, the unit 904 generates frames and reuses bus lanes in an upstream direction to send entire frames to a host which stores copies of the frames in its frame buffer and only displays the frames on the host display device. Other advantages will be recognized by those of ordinary skill in the art.

Figure 31:
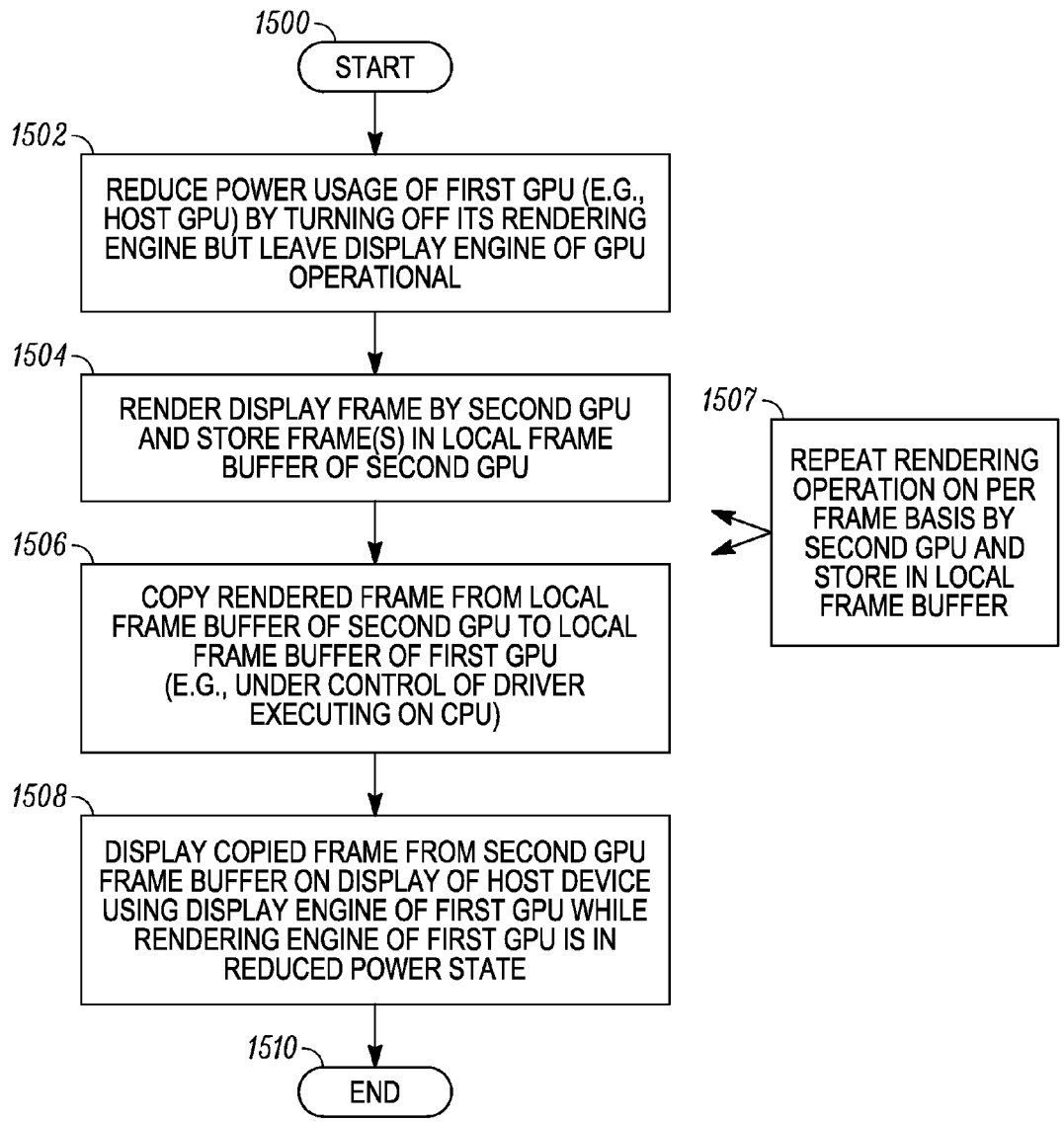
FIG. 31 is a flow chart illustrating one example of a method of rendering frames and displaying frames using a plurality of graphics processors in accordance with one example.

FIG. 31 illustrates one example of a method that may be carried out by multiple graphics processors and corresponding logic in any suitable architecture. As shown in block 1500, the method may begin with a user being prompted by a driver application executing on a CPU to allow a user to select a low power mode for a graphics processor or other portion of a system. As shown in block 1502, the method includes reducing power of a first GPU, such as a GPU in a host device or other suitable GPU, by disabling or otherwise not using the rendering engine but leaving the display engine of the GPU operational. For example, graphics processors are known that allow subsystems thereon to be selectively controlled for power reduction purposes. As known in the art, a graphics processor may include a rendering engine which generates the frames based on 3D commands and/or generating video frames based on compressed video or other video source information. A display engine portion of the GPU reads the completed frame out of the frame buffer and displays it on one or more displays. The method includes leaving the display engine on in the GPU so that it is still able to display frames that are stored in the frame buffer corresponding to the first GPU, but the rendering engine is in a reduced power state and preferably in a state that does not allow rendering so that maximum power reduction is provided.

The method includes, as shown in block 1504 and as noted above, rendering a display frame by another graphics processor and storing the rendered frame in its local frame buffer. This may be done, for example, by receiving suitable data via the communication path between the processors such as shown in FIG. 25 via the connector 100 and differential bus. However, any suitable link can be used. As shown in block 1506, the method includes copying the rendered frame from the local frame buffer of the second GPU to the local frame buffer of the first GPU as described above under control of, for example, the driver executing on the host CPU. However, the synchronization scheme as noted above may be any suitable synchronization scheme and a push or pull scheme may be used to cause the copying to occur. As shown in block 1507, the process is completed for each frame that is rendered by the second GPU.

As shown in block 1508, the method includes displaying the copied frame from the second GPU frame buffer using the display engine of the first GPU since the copied frame is now located in the frame buffer of the GPU whose rendering engine is effectively shut down but whose display engine is operational. This is done while the rendering engine is in the reduced power state. In one example the operations shown in blocks 1504, 1506 and 1508 are all performed while the rendering engine of the first GPU is in the reduced power state thereby maximizing power savings and reducing thermal output.

The method as noted may be carried out by the first and second devices shown in FIG. 25 wherein each device includes at least one graphics processor and corresponding frame buffer. In addition, for the second GPU to render a frame, it receives data such as drawing commands or video processing commands from the second device since the rendering engine in the first graphics processor is not employed.

The graphics processor 933 for example in the device 904 renders a display frame in response to a rendering engine of another graphics processor being in a reduced power state and stores the rendered frame in a corresponding frame buffer 930. Logic, that may be incorporated for example as part of the electronic circuitry 414 causes copying of the rendered frame from the corresponding frame buffer to the frame buffer of the other graphics processor 922 and 923 in response to the rendering engine of the other graphics processor being in a reduced power state. As noted above, the logic may cause copying based on a request by the driver executing on a CPU to request copying of the information from the frame buffer 930 to the frame buffer 923 or by a request from one of the several graphics processors. Alternatively, the graphics processor and device 904 may simply output a frame that is rendered once it is complete to the frame buffer 923. Any suitable copying scheme may be used.

It will be recognized that any suitable architecture may be used that employs any suitable communication path between the multiple graphics processors. For example the graphics processors (e.g., cores) may be co-located on a same printed circuit board, may be on separate boards in the same device or may be in separate devices as shown in the example of FIG. 25.

The above detailed description of the invention and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. An electronic device comprising:
    a housing containing at least:
        an A/C input or DC power input;
        at least one circuit substrate comprising graphics processing circuitry operatively coupled to receive power based on the A/C input or DC power input;
        a divided multi-connector element differential bus connector, operatively coupled to the electronic circuitry, comprised of a single housing, adapted to mechanically connect with the circuit substrate having disposed therein:
            a divided electrical contact configuration comprised of a first group of electrical contacts divided from an adjacent second group of contacts, the first group of electrical contacts comprising:
                a row of lower contacts and a row of upper contacts; and
                the second group of electrical contacts having an identical and mirrored configuration as the first group of contacts comprising:
                    an identical and mirrored corresponding row of lower contacts and an identical and mirrored corresponding row of upper contacts;
                    and a local frame buffer operatively coupled to the graphics processing circuitry,
        wherein the graphics processing circuitry is operative to generate and store display frames in the local frame buffer for another electronic device external to the housing in response to data received from the other device via the divided multi-connector element differential bus connector and operative to communicate the display frames to the other device via the divided multi-connector element differential bus connector.

2. The electronic device of claim 1 wherein the graphics processing circuitry is operative to communicate with a processor in the other electronic device external to the housing through the divided multi-connector element differential bus connector and wherein the graphics processing circuitry is operative to receive at least drawing commands from the processor and communicate frames of display data to the other device for display by the other device.

3. The electronic device of claim 1 wherein the graphics processing is operative to communicate display data with the other electronic device using a plurality of lanes of differential links provided via the divided multi-connector element differential bus connector.

4. The electronic device of claim 1 wherein the housing of the electrical connector is sized to provide a footprint of approximately 12 mm×53 mm and a profile of approximately 53 mm×6 mm.

5. The electronic device of claim 4 wherein the rows of lower and upper contacts for both the first and second group of electrical contacts comprise 124 pins configured for two 8 lane differential buses.

6. The electronic device of claim 1 wherein the housing of the electrical connector is sized to provide a footprint of approximately 12 mm×32 mm and a profile of approximately 32 mm×6 mm and comprising 68 pins configured in a row of lower contacts and upper contacts.

7. A system comprising:
an electronic device comprising:
a housing containing at least:
an A/C input or DC power input;
at least one circuit substrate comprising graphics processing circuitry operatively coupled to receive power based on the A/C input or DC power input;
a first divided multi-connector element differential bus connector, operatively coupled to the electronic circuitry, comprised of a single housing, adapted to mechanically connect with the circuit substrate having disposed therein:
a divided electrical contact configuration comprised of a first group of electrical contacts divided from an adjacent second group of contacts, the first group of electrical contacts comprising:
a row of lower contacts and a row of upper contacts; and
the second group of electrical contacts having an identical and mirrored configuration as the first group of contacts comprising:
an identical and mirrored corresponding row of lower contacts and an identical and mirrored corresponding row of upper contacts;
and a local frame buffer operatively coupled to the graphics and/or video processing circuitry,
wherein the graphics processing circuitry is operative to generate and store display frames in the local frame buffer for another electronic device external to the housing in response to graphics and/or video data received from the other device via the divided multi-connector element differential bus connector and operative to communicate the display frames to the other device via the divided multi-connector element differential bus connector; and
the other electronic device comprising:
a second divided multi-connector element differential bus connector identical to the first divided multi-connector element differential bus connector and connected with the first divided multi-connector element differential bus connector; and
a display engine and corresponding frame buffer wherein the frame buffer is operatively coupled to store display frames received from the electronic device via the second divided multi-connector element differential bus connector and operative to cause the display frames to be displayed on the display.

8. The system of claim 7 wherein the graphics processing circuitry is operative to communicate with a processor in the other electronic device external to the housing through the divided multi-connector element differential bus connector and wherein the graphics processing circuitry is operative to receive at least drawing commands from the processor and communicate frames of display data to the other device for display by the other device.

9. The system of claim 7 wherein the graphics processing is operative to communicate display data with the other electronic device using a plurality of lanes of differential links provided via the divided multi-connector element differential bus connector.

10. The system of claim 7 wherein the housing of the electrical connectors is sized to provide a footprint of approximately 12 mm×53 mm and a profile of approximately 53 mm×6 mm.

11. The system of claim 10 wherein the rows of lower and upper contacts for both the first and second group of electrical contacts comprise 124 pins configured for two 8 lane differential buses.

12. The system of claim 10 wherein the housing of the electrical connector is sized to provide a footprint of approximately 12 mm×32 mm and a profile of approximately 32 mm×6 mm and comprising 68 pins configured in a row of lower contacts and upper contacts.

* * * * *